(12) United States Patent
Hurley

(10) Patent No.: US 7,703,473 B1
(45) Date of Patent: Apr. 27, 2010

(54) VALVE TESTER SUSPENSION ASSEMBLY

(75) Inventor: Lyndon J. Hurley, Harrisburg, SD (US)

(73) Assignee: Hurco Technologies, Inc., Harrisburg, SD (US)

( * ) Notice: Subject to any disclaimer, the term of this patent is extended or adjusted under 35 U.S.C. 154(b) by 959 days.

(21) Appl. No.: 11/394,889

(22) Filed: Mar. 31, 2006

Related U.S. Application Data

(63) Continuation-in-part of application No. 10/351,636, filed on Jan. 24, 2003, now Pat. No. 7,607,624.

(51) Int. Cl.
  *F16M 13/00* (2006.01)
(52) U.S. Cl. ............... 137/343; 248/123.11; 248/122.1; 137/899
(58) Field of Classification Search ......... 137/899, 137/343; 248/123.11, 15.7, 125.9, 284.1, 248/280.11, 279.1, 122.1
  See application file for complete search history.

(56) References Cited

U.S. PATENT DOCUMENTS

| | | | |
|---|---|---|---|
| 2,548,146 A | 4/1951 | Ferris | |
| 2,548,147 A | 4/1951 | Ferris | |
| 3,417,953 A | 12/1968 | Hillquist | |
| 3,565,372 A | 2/1971 | Jones | |
| 4,063,359 A | 12/1977 | Luscombe | |
| 4,080,530 A * | 3/1978 | Krogsrud | 362/402 |
| 4,183,489 A | 1/1980 | Copher | |
| 4,463,858 A | 8/1984 | Bilas | |
| 4,478,041 A | 10/1984 | Pollman | |
| 4,481,770 A | 11/1984 | Lohbauer et al. | |
| 4,523,286 A | 6/1985 | Koga et al. | |
| 4,561,459 A | 12/1985 | Jackman | |
| 4,600,364 A | 7/1986 | Nakatani et al. | |
| 4,869,002 A | 9/1989 | Glenn | |
| 4,883,249 A | 11/1989 | Garland | |
| 4,987,690 A | 1/1991 | Aaldenberg | |
| 5,299,770 A | 4/1994 | Sayles | |
| 5,330,014 A | 7/1994 | Wagner | |
| 5,381,996 A | 1/1995 | Arnemann | |

(Continued)

FOREIGN PATENT DOCUMENTS

EP    0 089 412 A2    9/1983

OTHER PUBLICATIONS

The Wachs Company, "Automated Valve Operating Systems", (pp. 1-4).

(Continued)

*Primary Examiner*—John Rivell
*Assistant Examiner*—Eric Sporer
(74) *Attorney, Agent, or Firm*—Jeffrey A. Proehl; Woods, Fuller, Shultz & Smith, PC

(57) ABSTRACT

The system for suspending a valve exerciser from a support comprises a base element for mounting on the support, a first support element pivotally mounted on the base element, a second support element pivotally mounted on the first support element, a linking element pivotally mounted on the first support element, a first stabilizing element linking the base element and the linking element, a mounting element pivotally mounted on the second support element, a second stabilizing element linking the linking element and the mounting element, and a multiple stage assistance assembly for applying multiple degrees of assistance to movement of the first support element with respect to the base element.

20 Claims, 20 Drawing Sheets

U.S. PATENT DOCUMENTS

| | | | |
|---|---|---|---|
| 5,540,006 A | 7/1996 | Lloyd | |
| 5,556,217 A | 9/1996 | Deyo | |
| 5,560,130 A | 10/1996 | Bapst | |
| 5,662,176 A | 9/1997 | Madgwick | |
| 5,746,404 A | 5/1998 | Merkop | |
| 5,809,779 A | 9/1998 | Bruso | |
| 5,876,005 A | 3/1999 | Vasconi | |
| 5,937,373 A | 8/1999 | Ferrar | |
| 6,009,905 A | 1/2000 | Arnemann | |
| 6,056,065 A | 5/2000 | Campbell | |
| 6,131,391 A | 10/2000 | Poorman | |
| 6,155,359 A | 12/2000 | Gardner | |
| 6,550,734 B1 | 4/2003 | Spadea | |
| 7,334,606 B1 * | 2/2008 | Hurley | 137/899 |
| 7,607,624 B1 * | 10/2009 | Hurley | 248/278.1 |
| 2001/0053970 A1 | 12/2001 | Ford | |
| 2005/0076965 A1 | 4/2005 | Buckner | |
| 2005/0166350 A1 | 8/2005 | Buckner | |

OTHER PUBLICATIONS

E.H. Wachs Companies, "Truck Mounted Valve Operator Model TM-7", Product Manual, Jan. 2004, pp. 1-55.

E.H. Wachs Companies, "Wachs ValveCard 1.2", Product Manual, Sep. 1998, pp. 1-26.

* cited by examiner

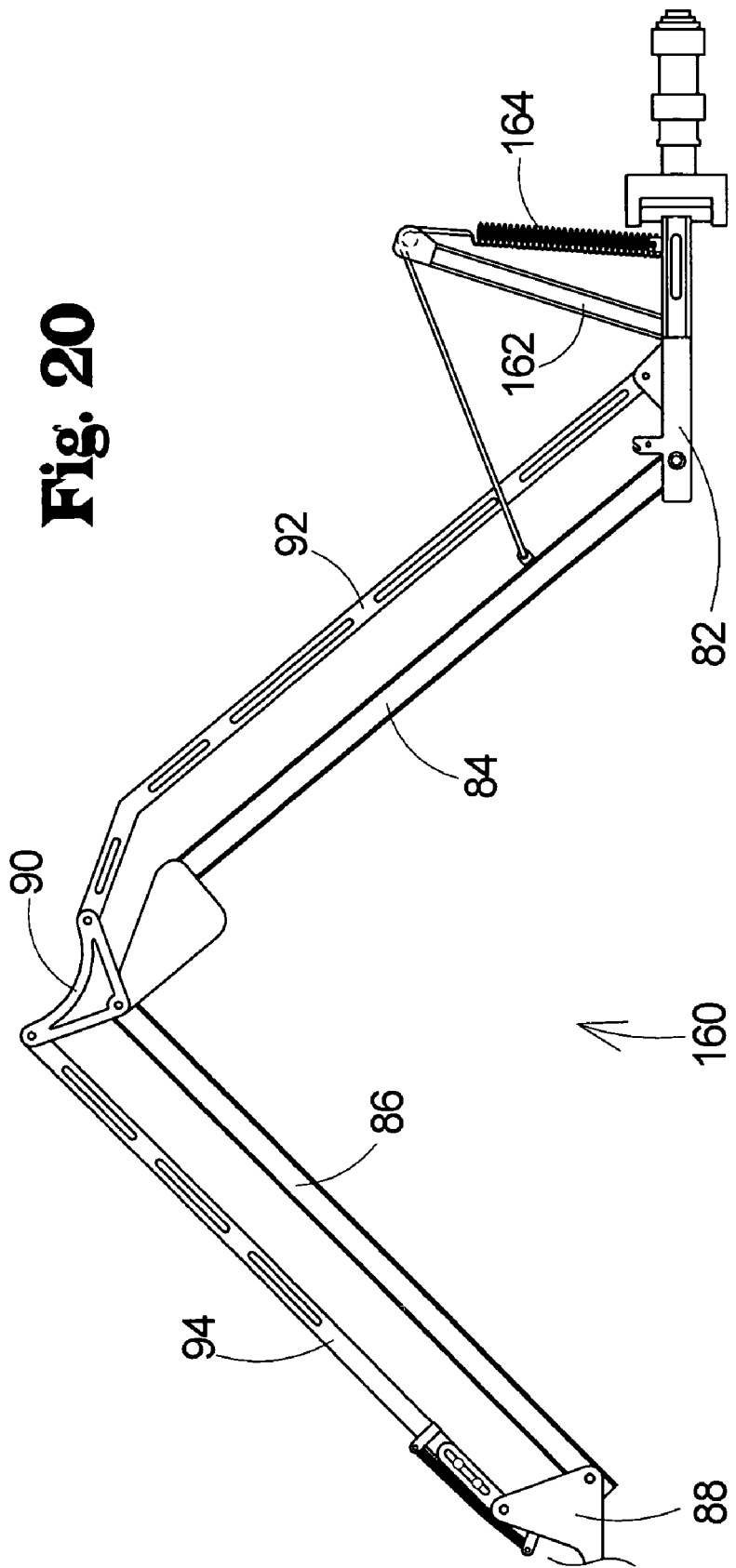

US 7,703,473 B1

VALVE TESTER SUSPENSION ASSEMBLY

REFERENCE TO RELATED APPLICATIONS

This application is a continuation-in-part of my patent application Ser. No. 10/351,636, filed Jan. 24, 2003 now U.S. Pat. No. 7,607,624, which is incorporated herein by reference in its entirety.

INCORPORATION BY REFERENCE

The following related and co-pending U.S. patent applications, which are commonly owned with the present patent application, are hereby incorporated by reference in their entireties:
VALVE TESTER SUSPENSION ENHANCEMENTS, Lyndon J. Hurley, filed Jul. 26, 2004, application Ser. No. 10/899,501, pending.
VALVE TESTER CONTROL ENHANCEMENTS, Lyndon J. Hurley, filed Feb. 15, 2005, application Ser. No. 11/058,506, pending.

BACKGROUND OF THE INVENTION

1. Field of the Invention

The present invention relates to suspension assemblies and more particularly pertains to a new valve tester suspension assembly for allowing one person to perform the tasks necessary to test the underground valves.

2. Description of the Prior Art

The use of suspension assemblies is known in the prior art. U.S. Pat. No. 6,155,359 describes a vehicle mounted post hole digger. Another type of suspension assemblies is U.S. Pat. No. 4,869,002 and U.S. Pat. No. 5,540,006 each disclose a hydraulically operated digging arm attached to a vehicle. U.S. Pat. No. 4,883,249 discloses a counterbalancing mechanism for a constant force or load. U.S. Pat. No. 5,560,130 discloses a trenching apparatus pivotally mounted to a tractor. U.S. Pat. No. 5,746,404 discloses a wire and pulley internal spring counterbalancing mechanism. U.S. Pat. No. 5,876,005 discloses an articulated arm for supporting a camera from the cargo rack of an all-terrain vehicle. U.S. Pat. No. 4,463,858 discloses a reversible portable hoist lacking means for vertically aligning the hook of the device with a desired point on a supporting surface without moving the vehicle. U.S. Pat. No. 5,809,779 discloses an auxiliary hydraulic power unit of the type that would be used in association with the present invention.

While these devices fulfill their respective, particular objectives and requirements, the need remains for a device that can assist in supporting the weight of a rotating assembly used to test underground valves.

SUMMARY OF THE INVENTION

The present invention meets the needs presented above by providing a system for suspending a valve exerciser from a support that comprises a base element for mounting on the support, a first support element pivotally mounted on the base element, a second support element pivotally mounted on the first support element, a linking element pivotally mounted on the first support element, a first stabilizing element linking the base element and the linking element, a mounting element pivotally mounted on the second support element, a second stabilizing element linking the linking element and the mounting element, and a multiple stage assistance assembly for applying multiple degrees of assistance to movement of the first support element with respect to the base element.

Still yet another object of the present invention is to provide a new valve tester suspension assembly that converts a multiple person job to a job that can be done by a single worker.

Even still another object of the present invention is to provide a new valve tester suspension assembly that increases the efficiency of testing underground valves by making it unnecessary to precisely position a vehicle holding the required rotational device used in the testing.

Yet another object of the present invention is to provide a new valve tester suspension assembly that not only converts a two person job into a one person job, but reduces the physical requirements for the one person, thus reducing the potential for injury or accidents.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 20 is a schematic side view of a third embodiment of the suspension assembly in which the assistance assemblies are replaced with a tension element.

DESCRIPTION OF THE PREFERRED EMBODIMENT

Figure 1:
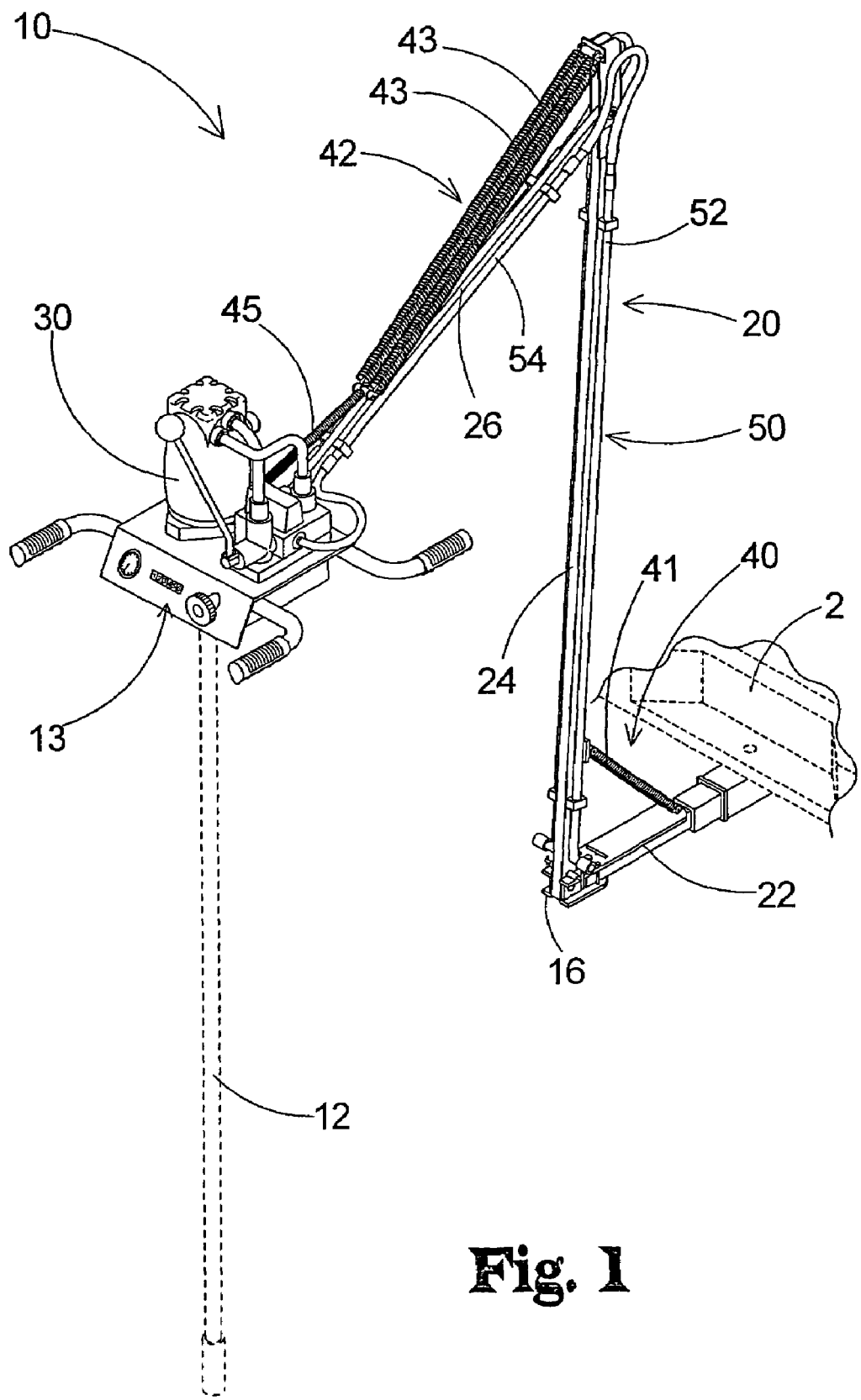
FIG. 1 is a perspective view of a new valve tester suspension assembly according to the present invention.
Figure 2:
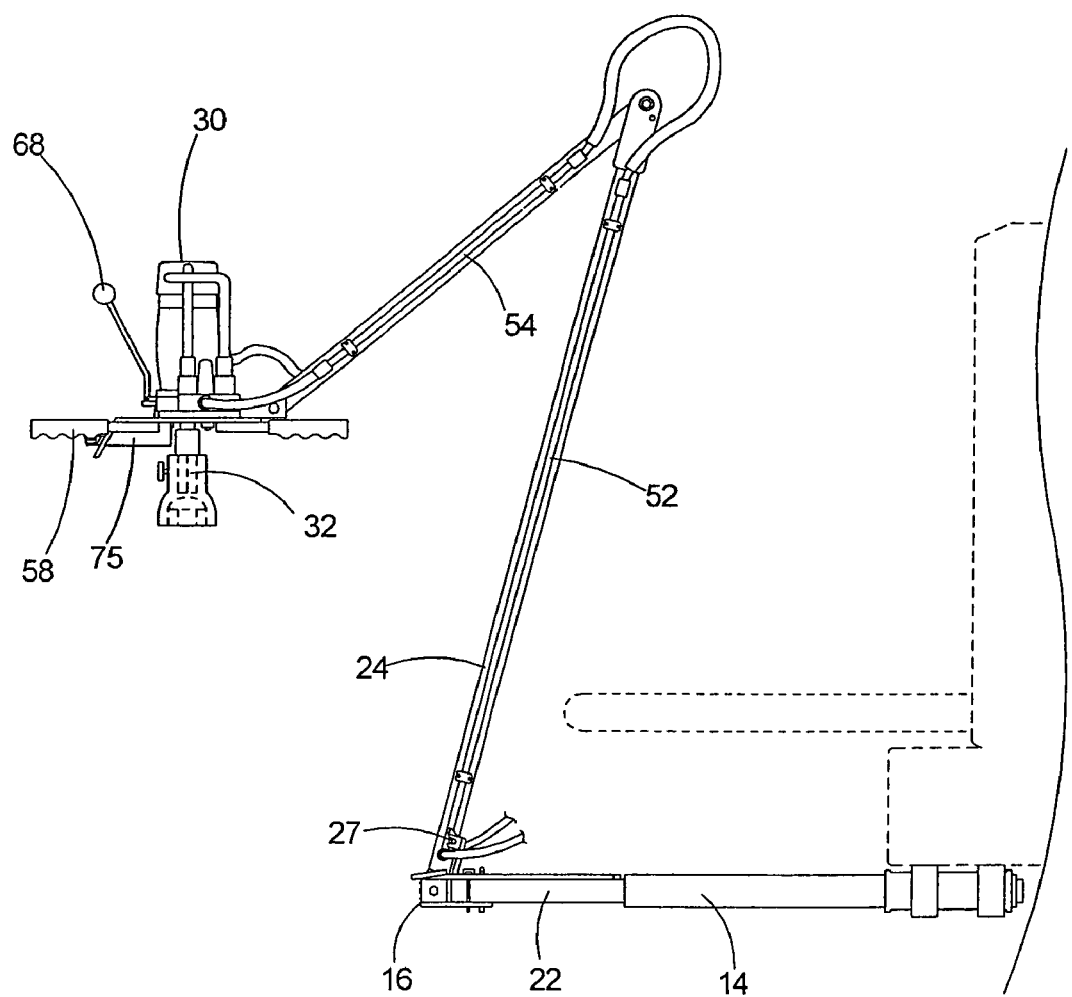
FIG. 2 is a side view of an embodiment of the present invention.
Figure 3:
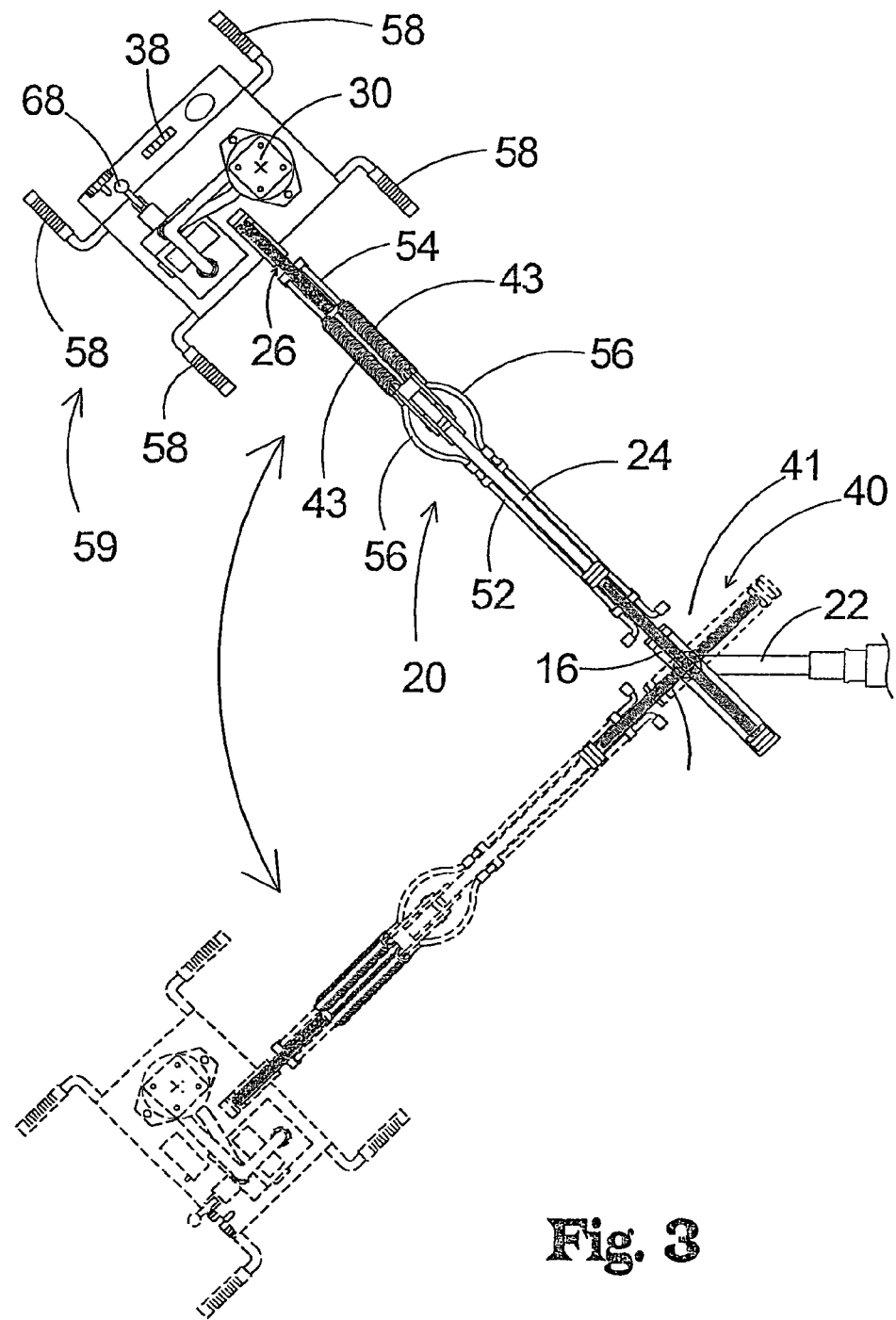
FIG. 3 is a perspective view of the present invention in an extended in use position.
Figure 4:
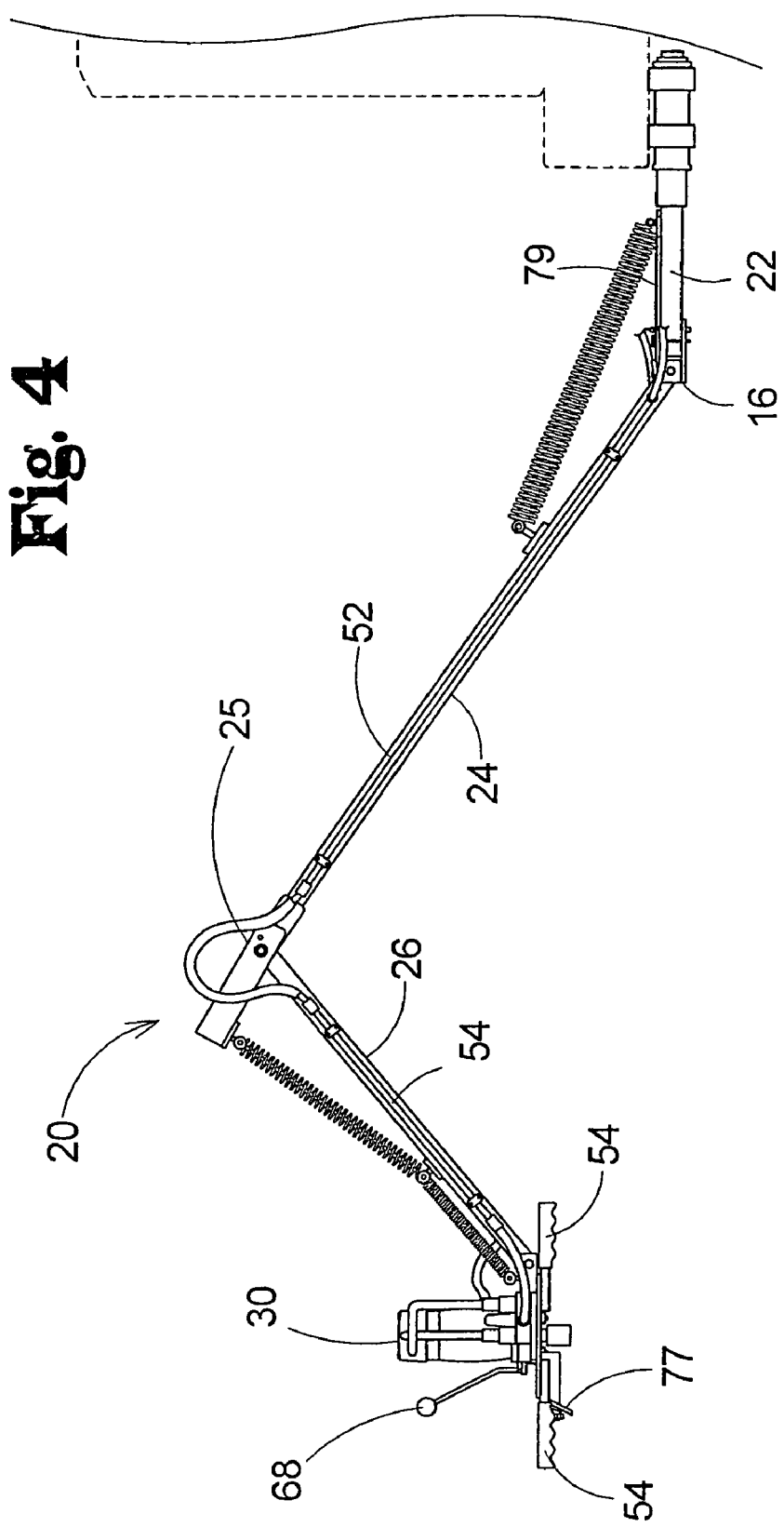
FIG. 4 is a side view of the present invention in an extended position resting on a ground surface.
Figure 5:
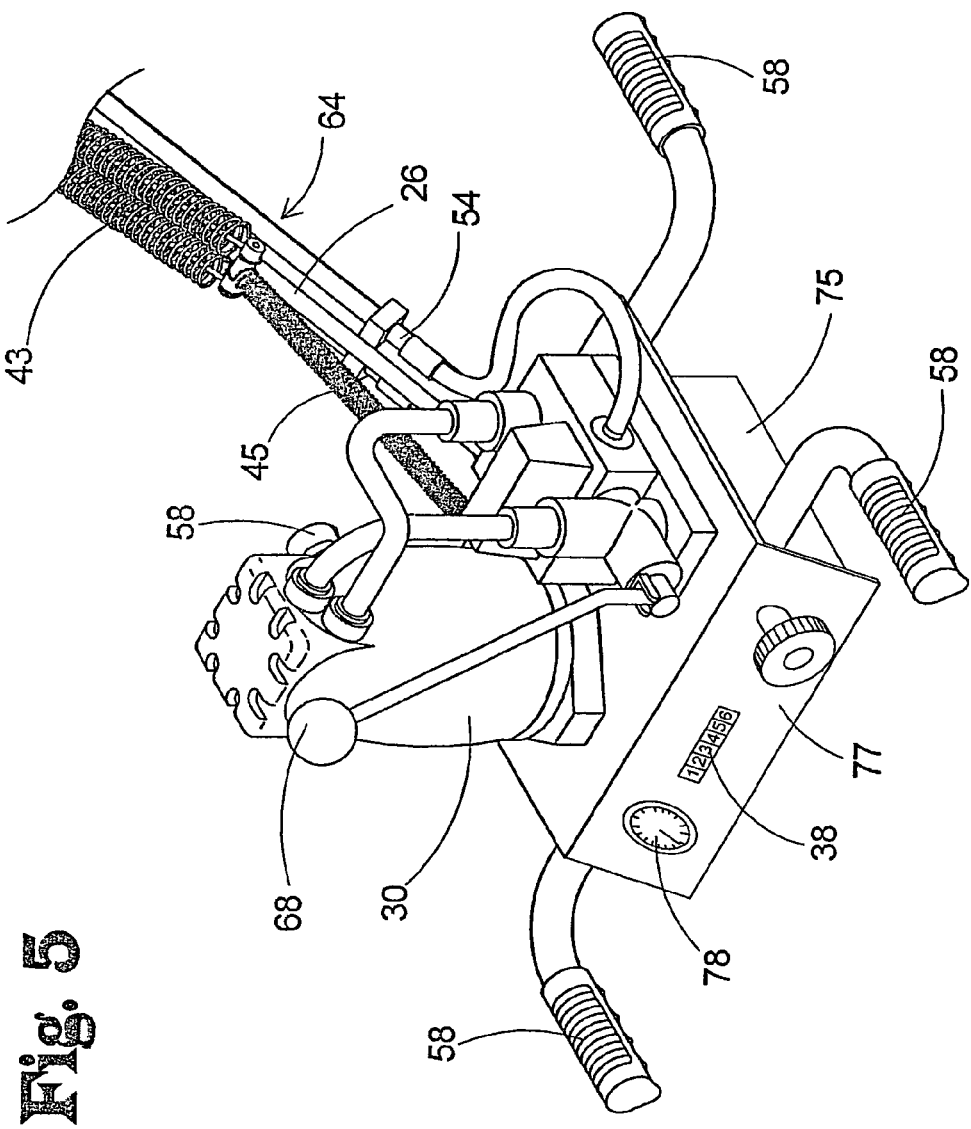
FIG. 5 is a perspective view of the rotating device of the present invention.
Figure 6:
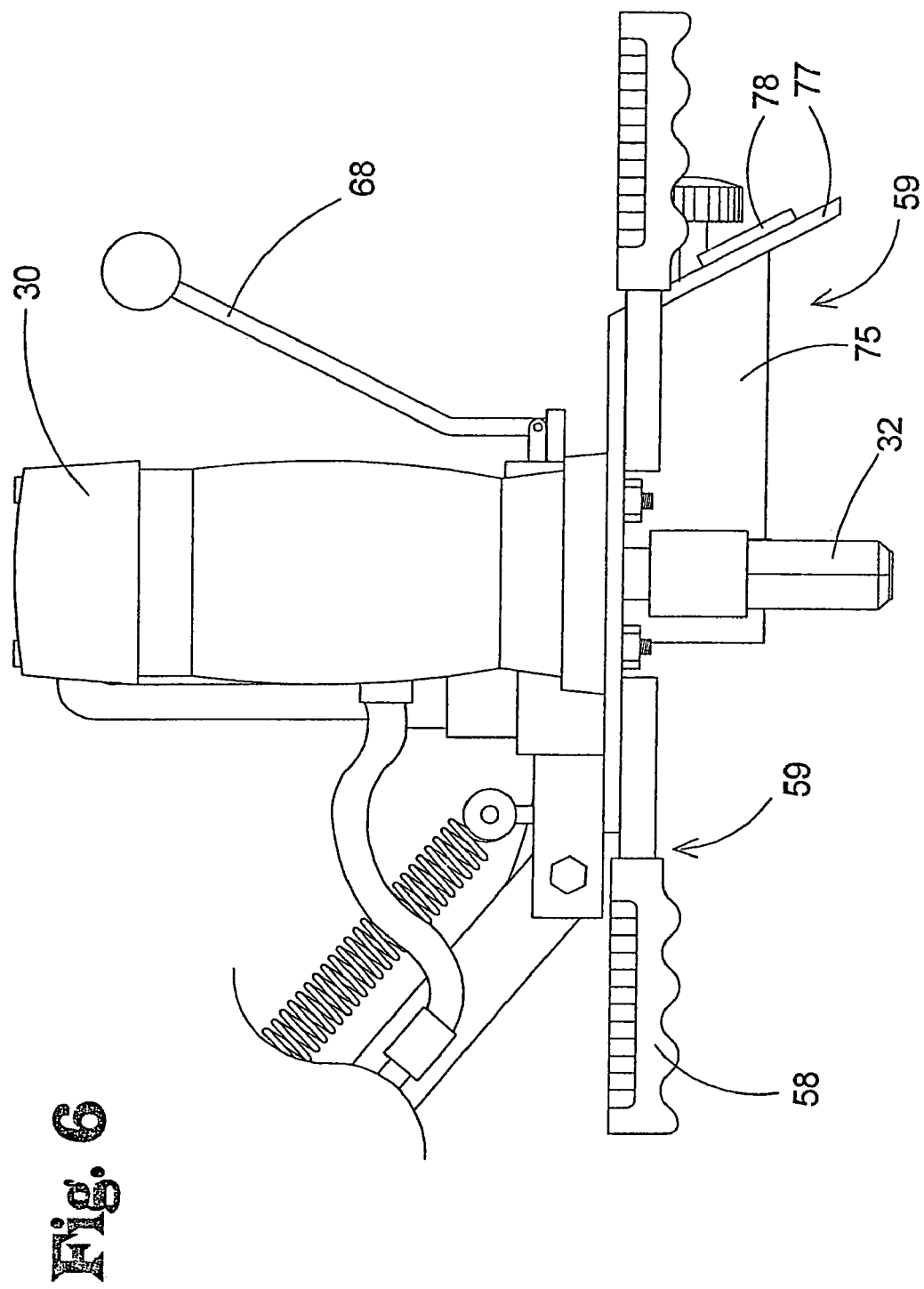
FIG. 6 is a side view of the rotating device of the present invention.

With reference now to the drawings, and in particular to FIGS. 1 through 20 thereof, a new valve tester suspension assembly embodying the principles and concepts of the present invention and generally designated by the reference numeral 10 will be described.

As best illustrated in FIGS. 1 through 12, a first embodiment of the valve tester suspension assembly 10 generally comprises an articulated arm assembly 20 designed for coupling to a vehicle 2. A hydraulically powered rotating assembly 30 is pivotally coupled to the arm assembly 20 such that the rotating assembly 30 is positionable in a substantially horizontal orientation at a selectable position in a three dimensional space adjacent the vehicle 2. A shaft 12 is provided having a first end 13 operationally couplable to the rotating assembly 30 for rotating the shaft 12. Typically, the shaft has a receiving portion having a geometric cross-sectional shape for receiving a protrusion 32 rotated by the rotating assembly 30. An adapter 28 is attachable to the protrusion 32 to permit exercising of fire hydrant valves. Alternately, the protrusion may include a geometric cross-sectional receiver portion for engaging fire hydrant valves and the shaft may be shaped to engage the receiver portion of the protrusion.

The arm assembly includes a first arm portion 22 designed for coupling to the vehicle 2 by means such as a hitch on the vehicle. For the purposes of this application, the term vehicle is specifically intended to include any device or structure for transporting persons or things thereby including direct connection to a trailer supporting a hydraulic power source. The arm assembly further includes a second arm portion 24 pivotally and rotatably coupled to a distal end 23 of the first arm portion 22. The arm assembly 20 includes a third arm portion 26 pivotally coupled to a distal portion 25 of the second arm portion 24.

In an embodiment, a first biasing assembly 40 is coupled between the first arm portion 22 and the second arm portion 24. A second biasing assembly 42 is coupled between the second arm portion 24 and the third arm portion 26. A third biasing assembly 44 is coupled between the third arm portion 26 and the rotating assembly 30.

To achieve the pivotal and rotatable coupling between the first and second arm portions, the first arm portion has a pivoting connection portion 16. The second arm portion is pivotally coupled to the connection portion 16. Connection portion 16 further includes an extension portion 79 that extends back adjacent to a main portion 15 of first arm portion 22 when the main portion 15 and the connection portion 16 are positioned in alignment with each other. Biasing means 40 is coupled to the extension portion 79 such that biasing means 40 pivots with second arm portion 24 when connection portion 16 pivots.

Figure 7:
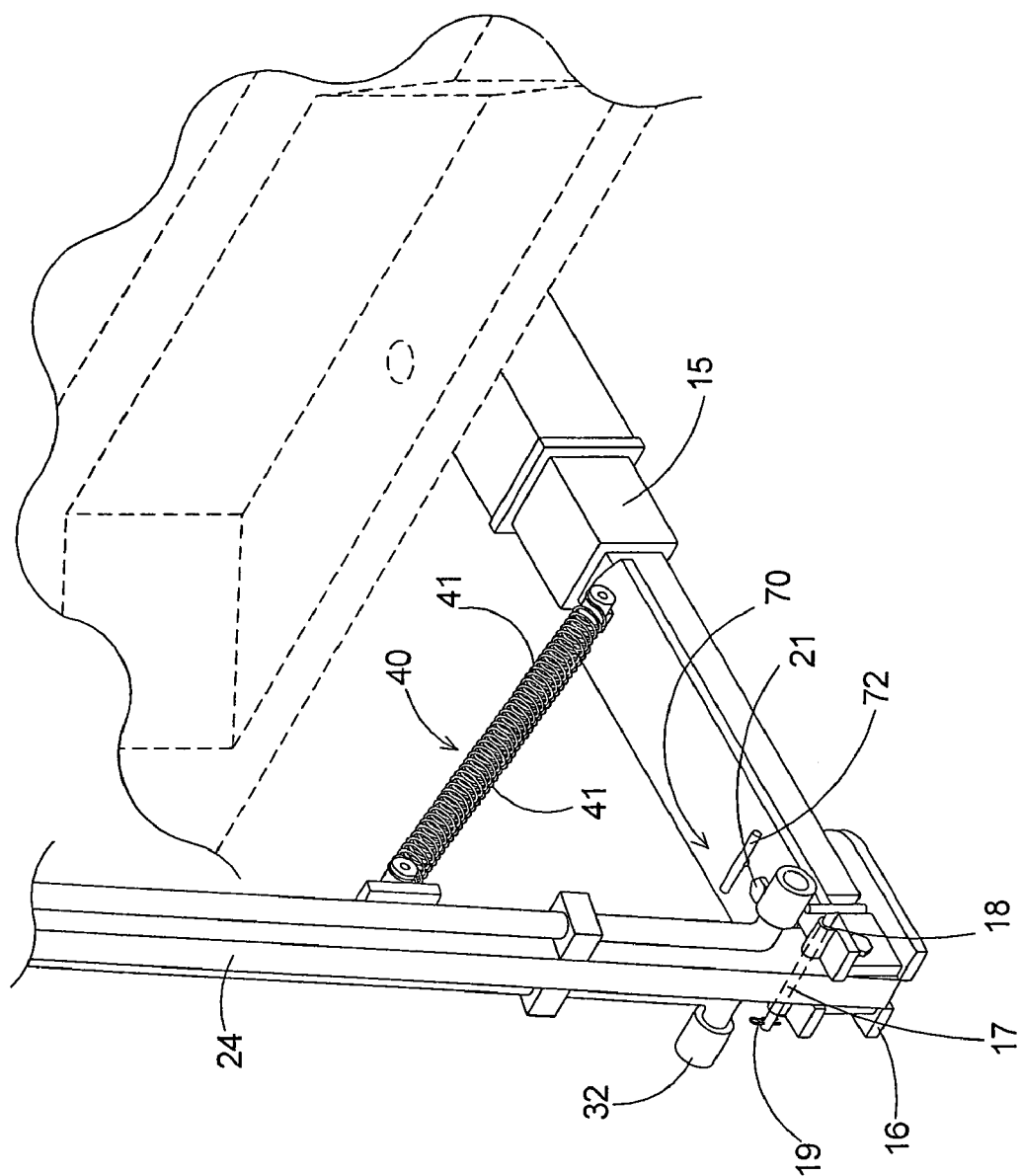
FIG. 7 is a perspective view of a proximal portion of the articulated arm of the present invention.
Figure 8:
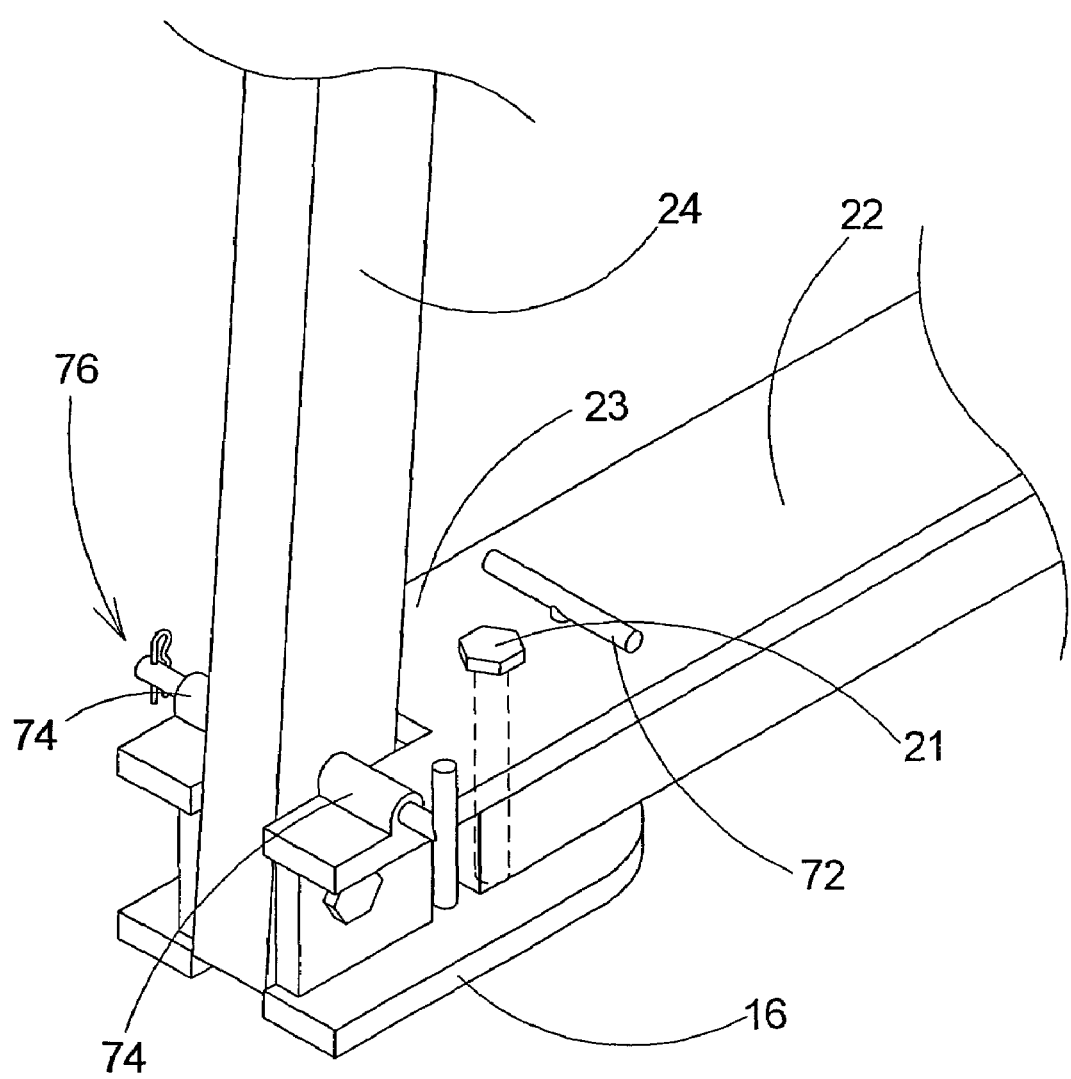
FIG. 8 is a perspective view of a locking means of the present invention.
Figure 9:
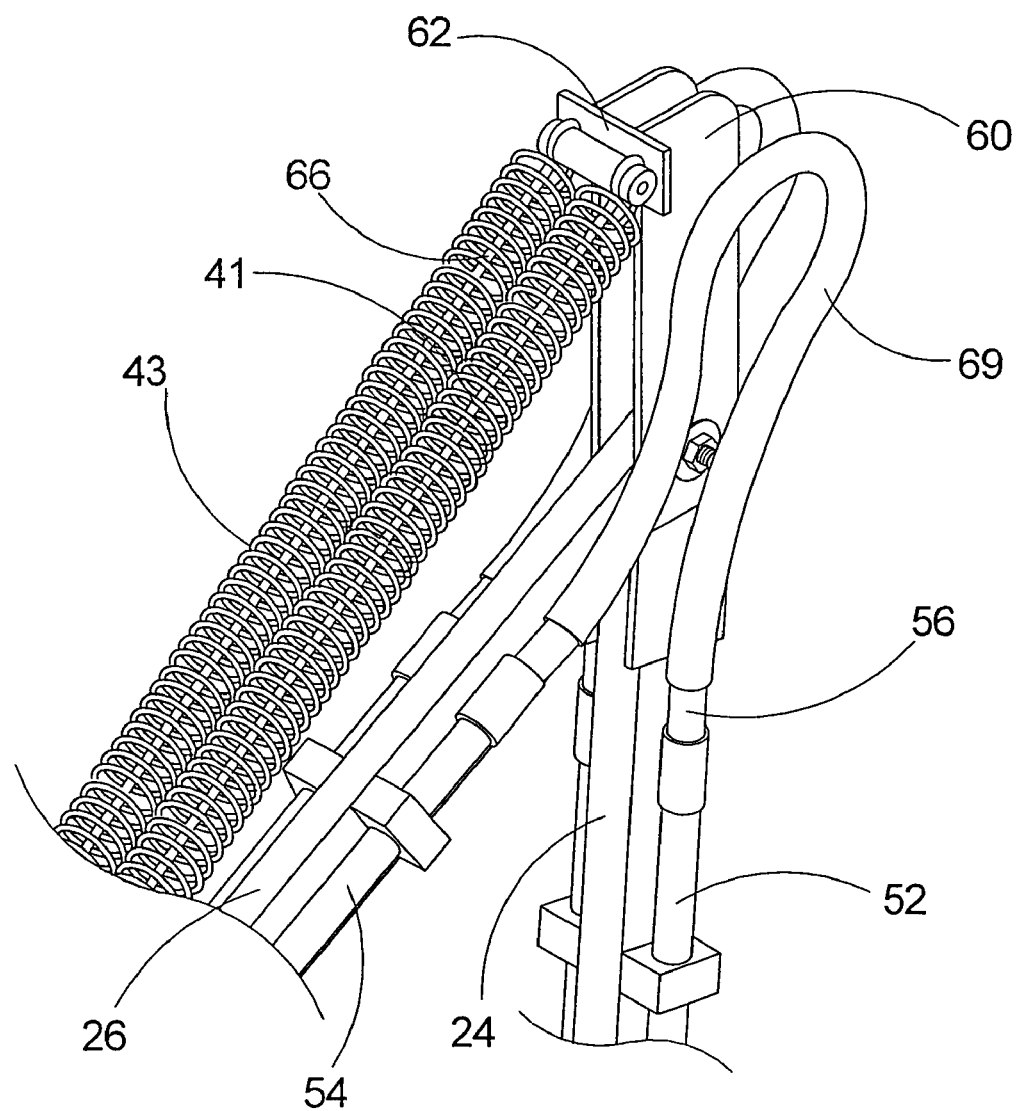
FIG. 9 is a perspective view of a medial portion of the articulated arm of the present invention.
Figure 10:
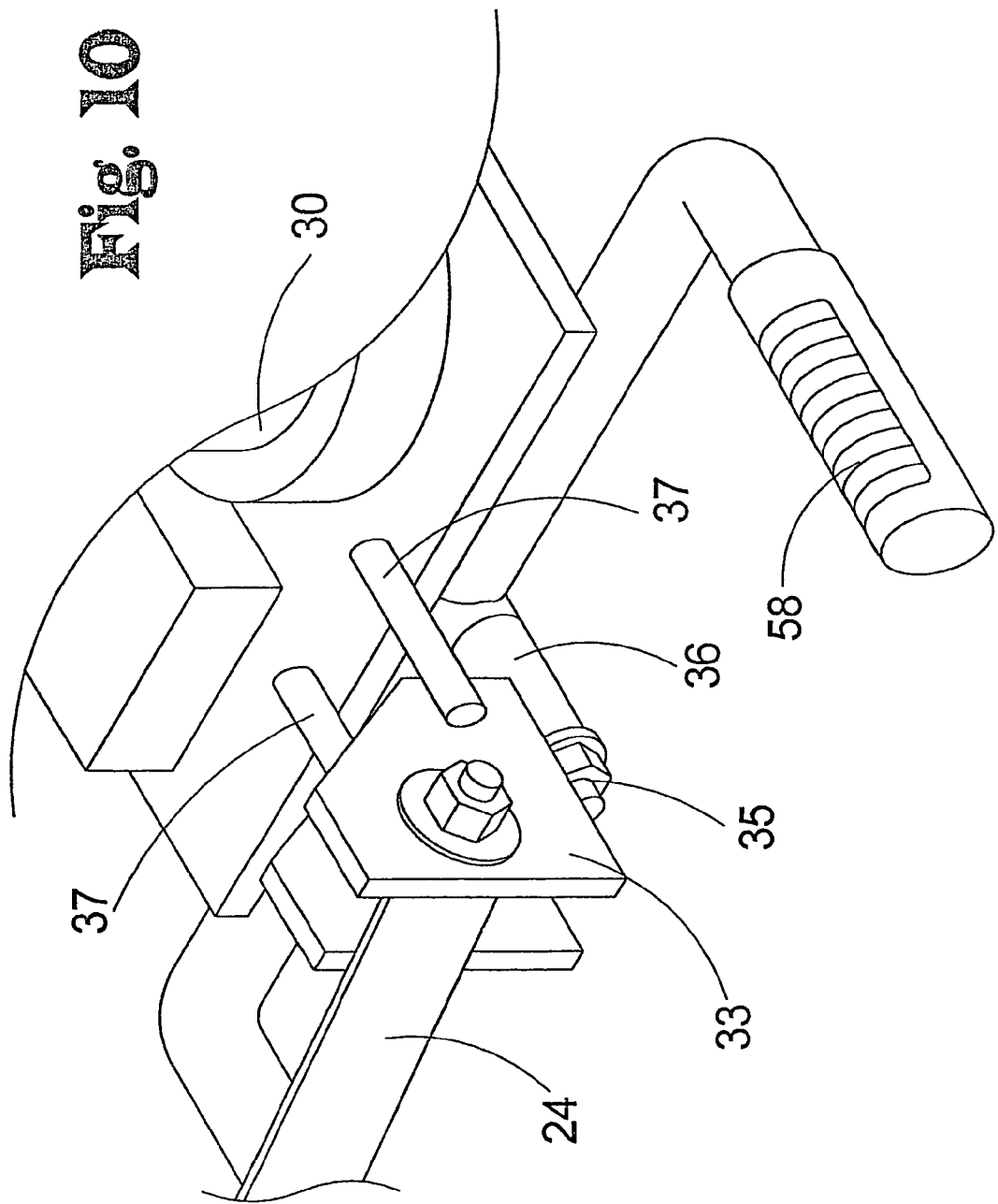
FIG. 10 is a perspective bottom view of an embodiment of the invention.

Hydraulic supply line assemblies 50 are coupled to the arm assembly 20 for providing hydraulic power to the rotating assembly 30. Each hydraulic line assembly includes a first fixed portion 52 coupled to the second arm portion 24. Each hydraulic line assembly 50 further includes a second fixed portion 54 coupled to the third arm portion 26. Each hydraulic line assembly 50 includes a flexible portion 56 coupling the first fixed portion 52 to the second fixed portion 54. A protective covering 69 is coupled to the flexible portion 56 of each hydraulic line assembly 50. Each second fixed portion 54 is operationally coupled to a respective one of an input and an output on the rotating assembly such that each of the hydraulic line assemblies forms either an inlet line or an outlet line. The connectors, as shown in FIG. 7, are differentiated to insure the inlet line and the outlet line are not reversed when connecting the invention to an auxiliary hydraulic power unit.

In the biased embodiment, the first biasing assembly 40 is a pair of first biasing assembly spring members 41 and the second biasing assembly 42 is a pair of second biasing assembly spring members 43. Each of the second pair of second biasing assembly spring members 43 is coupled between a distal end 60 of an extension portion 62 of the second arm portion 24 and a medial portion 64 of the third arm portion 26. Extension portion 62 may be a separate piece attached to second arm portion 24 or may be an integral extension of second arm portion 24. The third biasing assembly 44 is a single third biasing assembly spring member 45.

To enhance the safety of the biased embodiment in the event of catastrophic failure of a spring member, each spring member of the first, second and third biasing assemblies has a respective elastic core member 66 extending through the spring member.

A hydraulic control mechanism 68 is coupled to the rotating assembly 30 for facilitating user operation of the rotating assembly 30. Corresponding to the currently used practice for testing underground valves, a counter 38 is coupled to a display flange 77 of the rotating assembly 30 for counting rotations of the shaft 12. Additionally, a torque indicator gauge 78 is operationally coupled to the rotating assembly to indicate torque on the rotating assembly. This provides a new method of testing alternative to counting rotations of the shaft. A torque adjustment means 75 is operationally coupled to the rotating assembly for adjusting the amount of torque applied by the rotating assembly 30 to prevent overstressing of the valve assembly being exercised.

A first locking means 70 is provided for locking the second arm portion 24 from rotating relative to the first arm portion 22. A second locking means 76 is provided for locking the second arm portion 24 from pivoting relative to the first arm portion 22.

The first locking means 70 is a pin 72 insertable through the first arm portion 22 and the connection portion 16 in spaced relationship to a rotational pivot point 21 of the connection portion 16. Thus, the connection portion 16 is held in position by pin 72.

Figure 11:
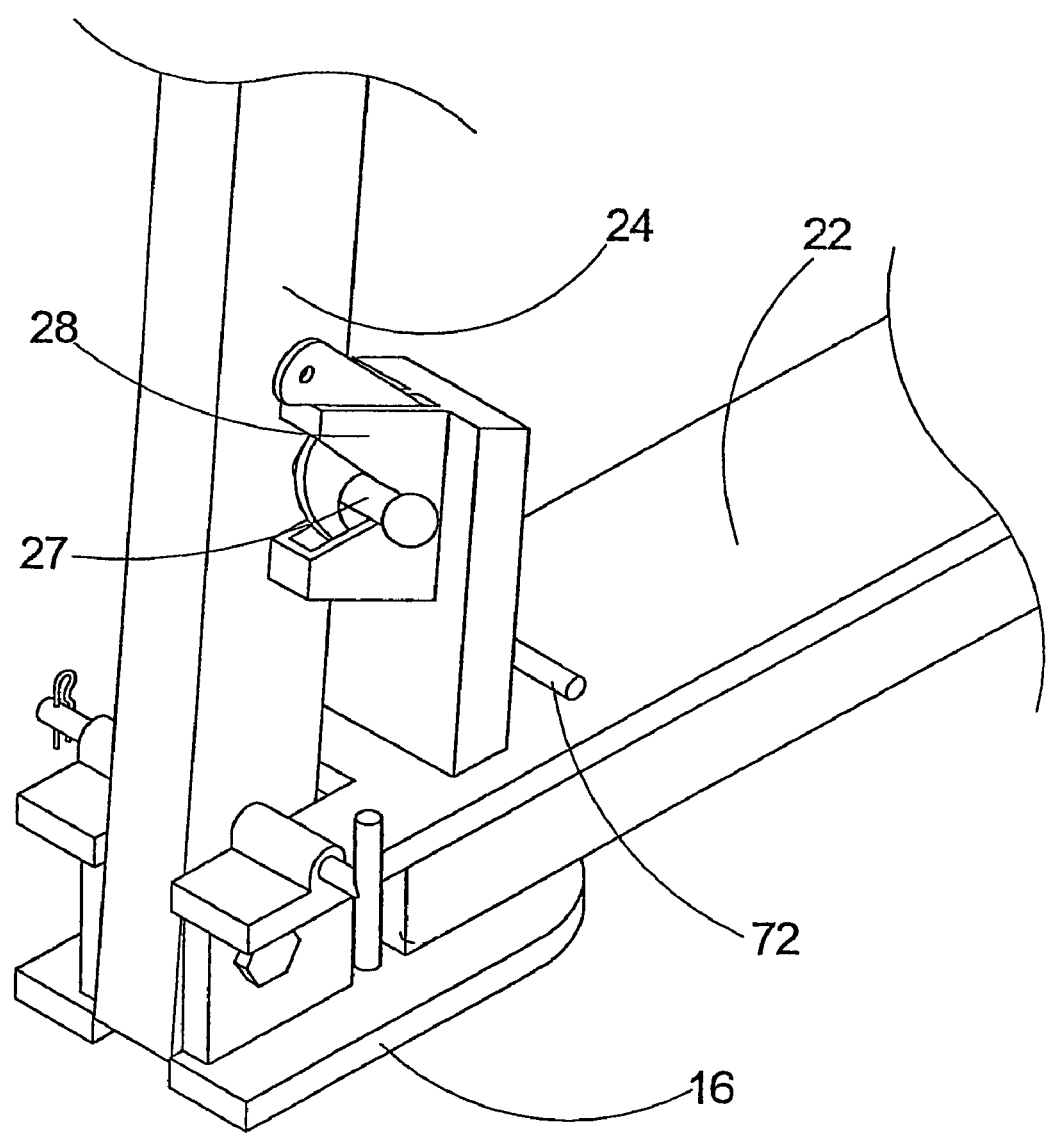
FIG. 11 is a perspective view of an alternate locking means for the articulated arm assembly.
Figure 12:
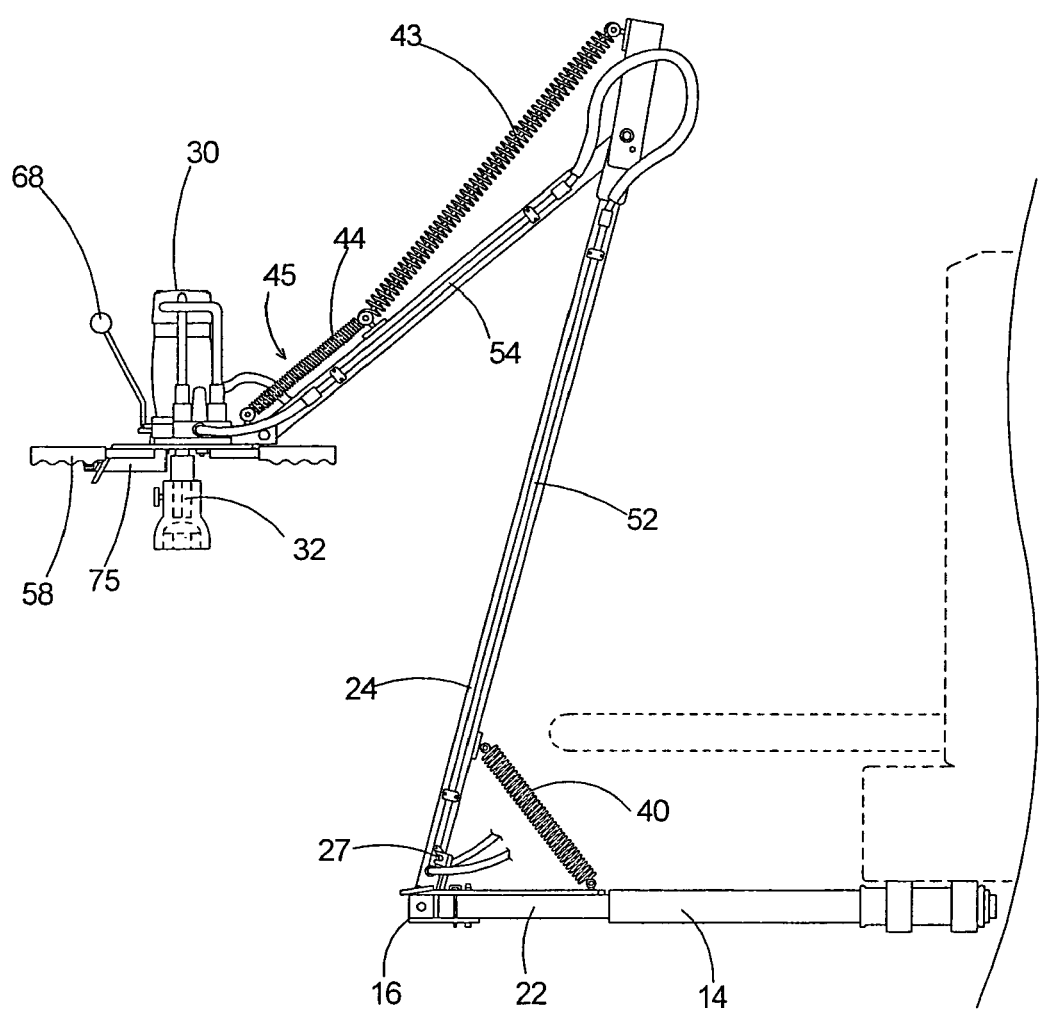
FIG. 12 is a side view of the present invention in a retracted position.
Figure 13:
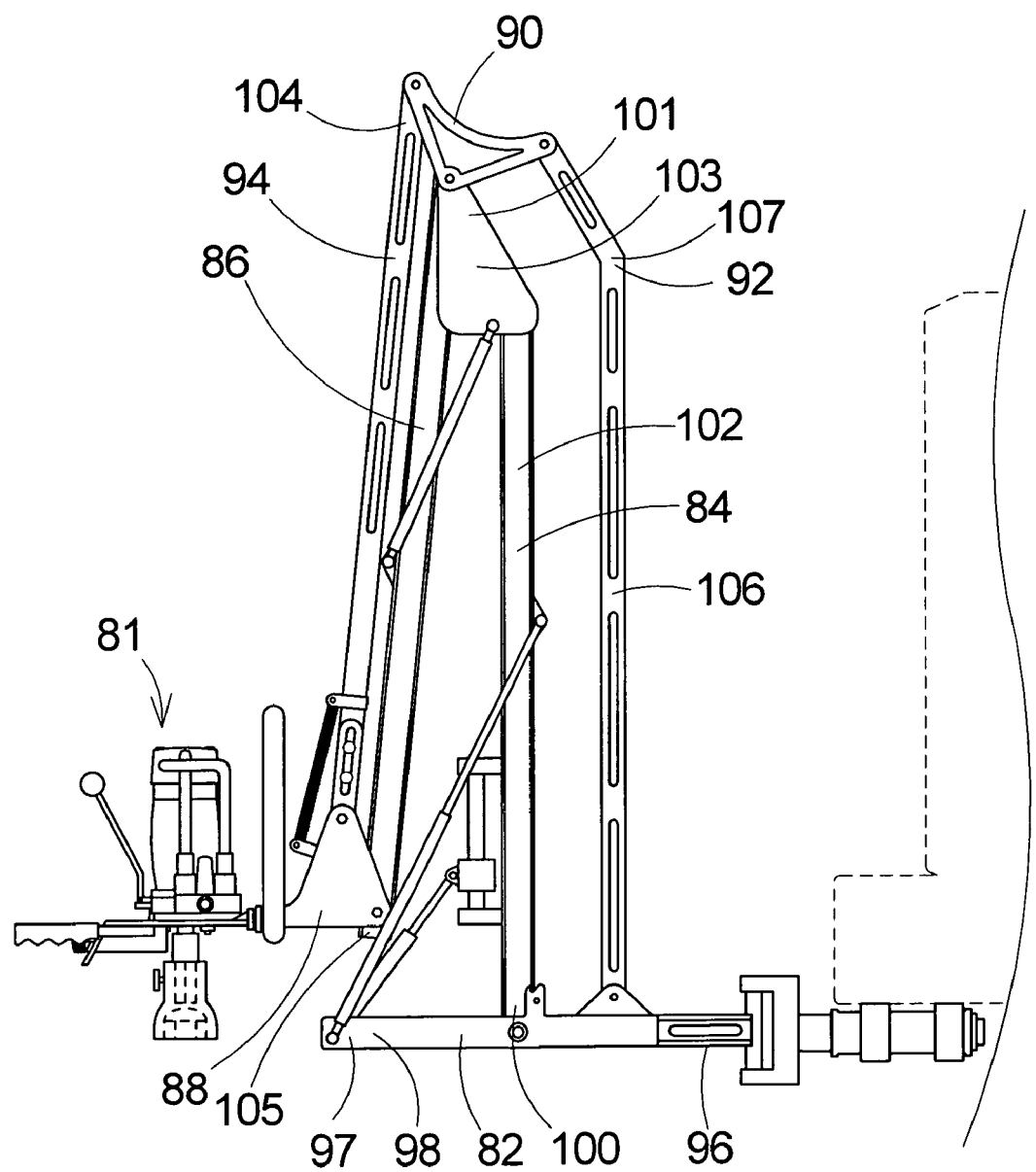
FIG. 13 is a schematic side view of a second embodiment of the suspension assembly of the present invention in a substantially retracted position showing the secondary assistance assembly in a position in which it does not affect the movement of the first support element.
Figure 14:
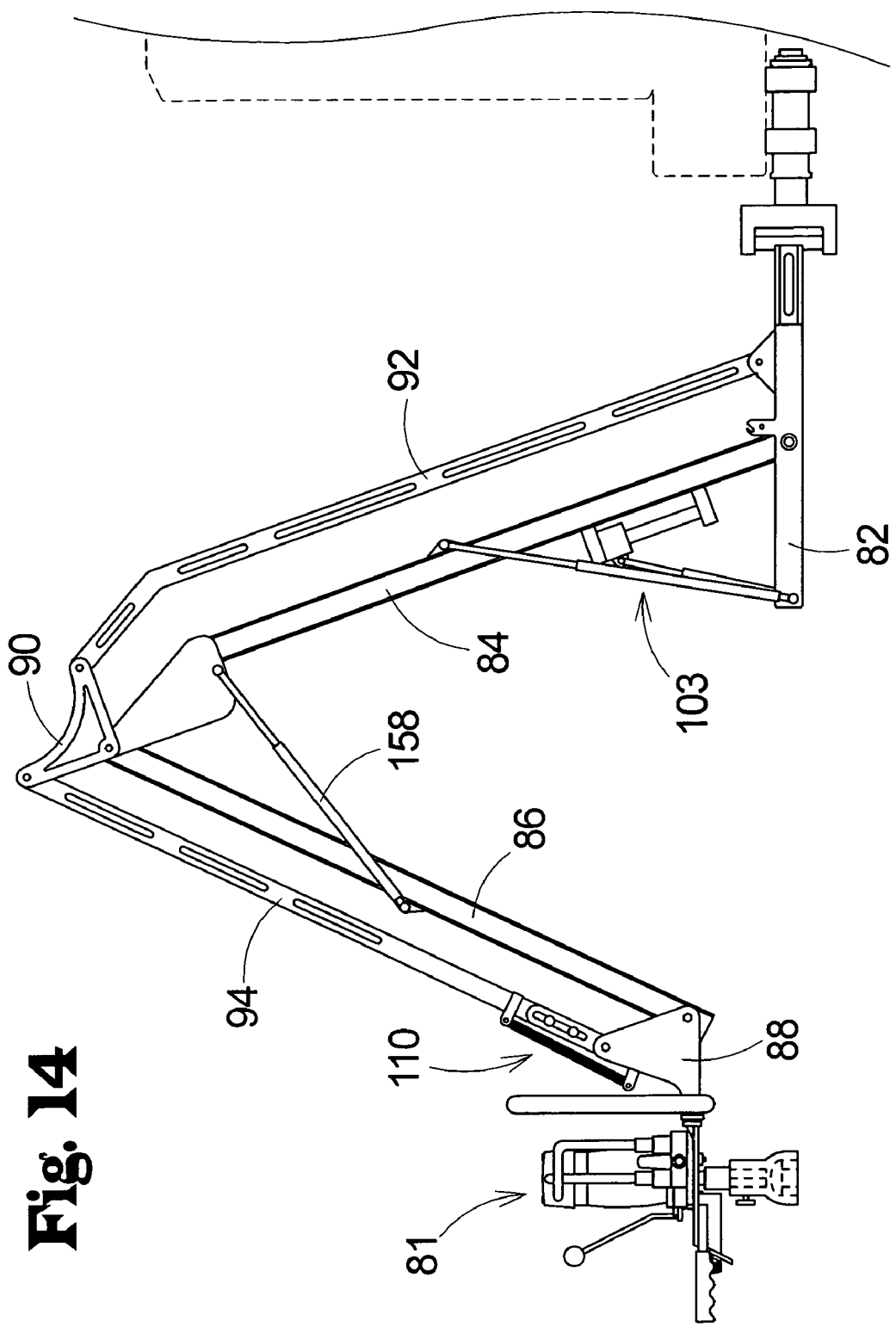
FIG. 14 is a schematic side view of the second embodiment of the suspension assembly of the present invention in a partially extended position showing the secondary assistance assembly in a position in which the assembly affects the movement of the first support element.
Figure 15:
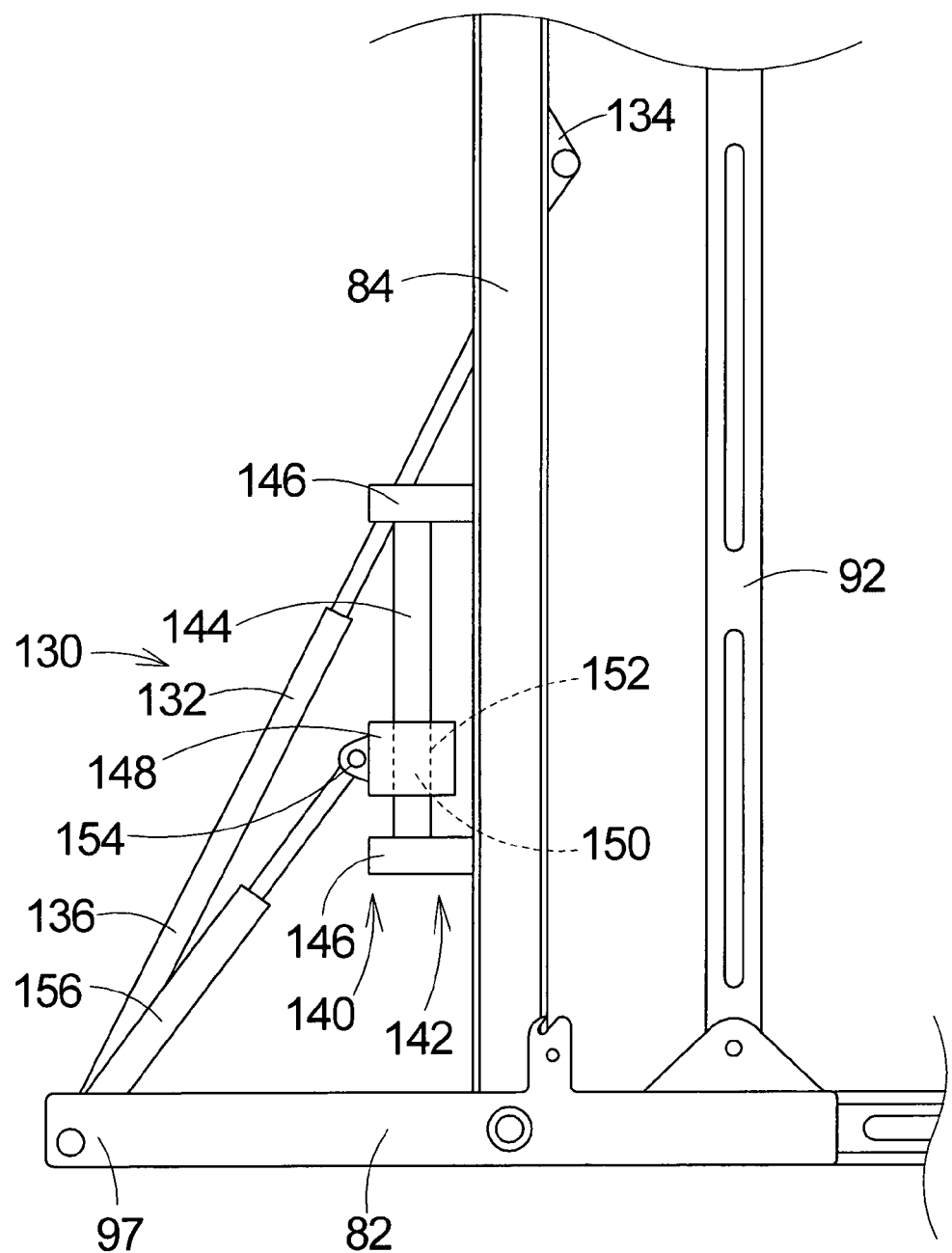
FIG. 15 is a schematic side view of the secondary assistance assembly in a position generally corresponding to the suspension assembly position shown in FIG. 13, in which the secondary assistance assembly does not affect the movement of the first support element.
Figure 16:
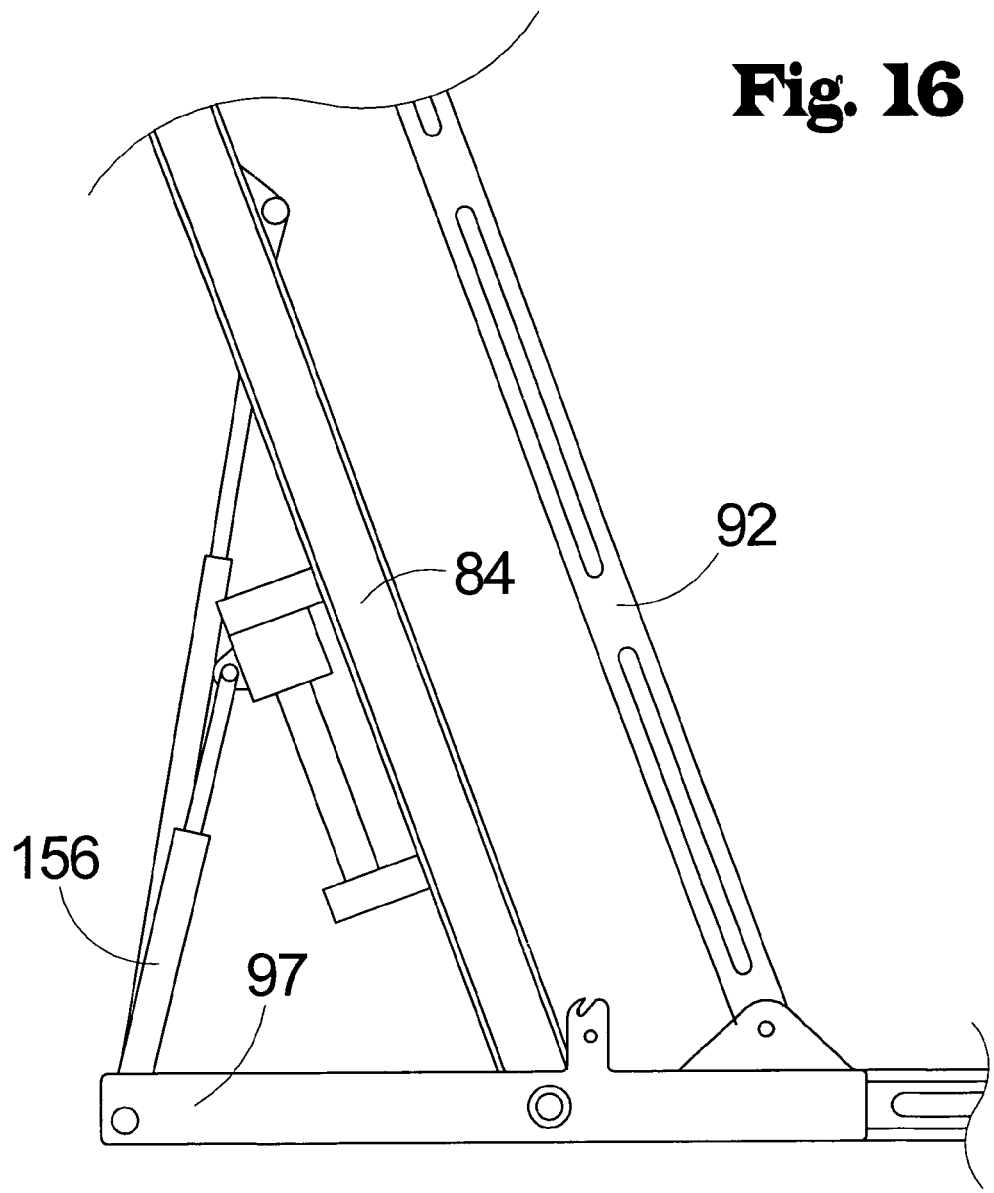
FIG. 16 is a schematic side view of the secondary assistance assembly in a position generally corresponding to the suspension assembly position shown in FIG. 14, in which the secondary assistance assembly affects the movement of the first support element.
Figure 17:
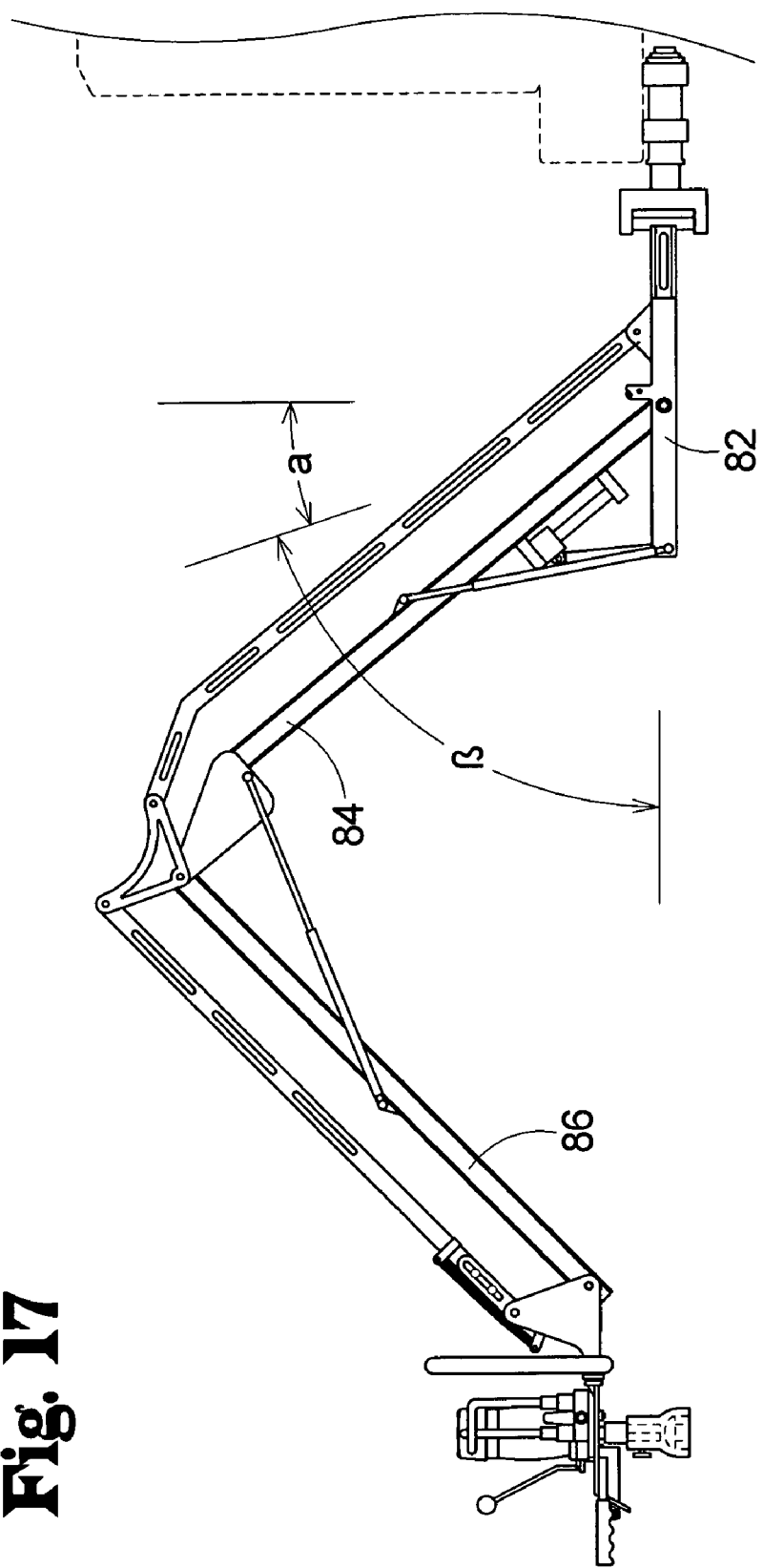
FIG. 17 is a schematic side view of the secondary assistance assembly in a position generally corresponding to a substantially fully extended position of the suspension assembly, in which the secondary assistance assembly affects the movement of the first support element.
Figure 18:
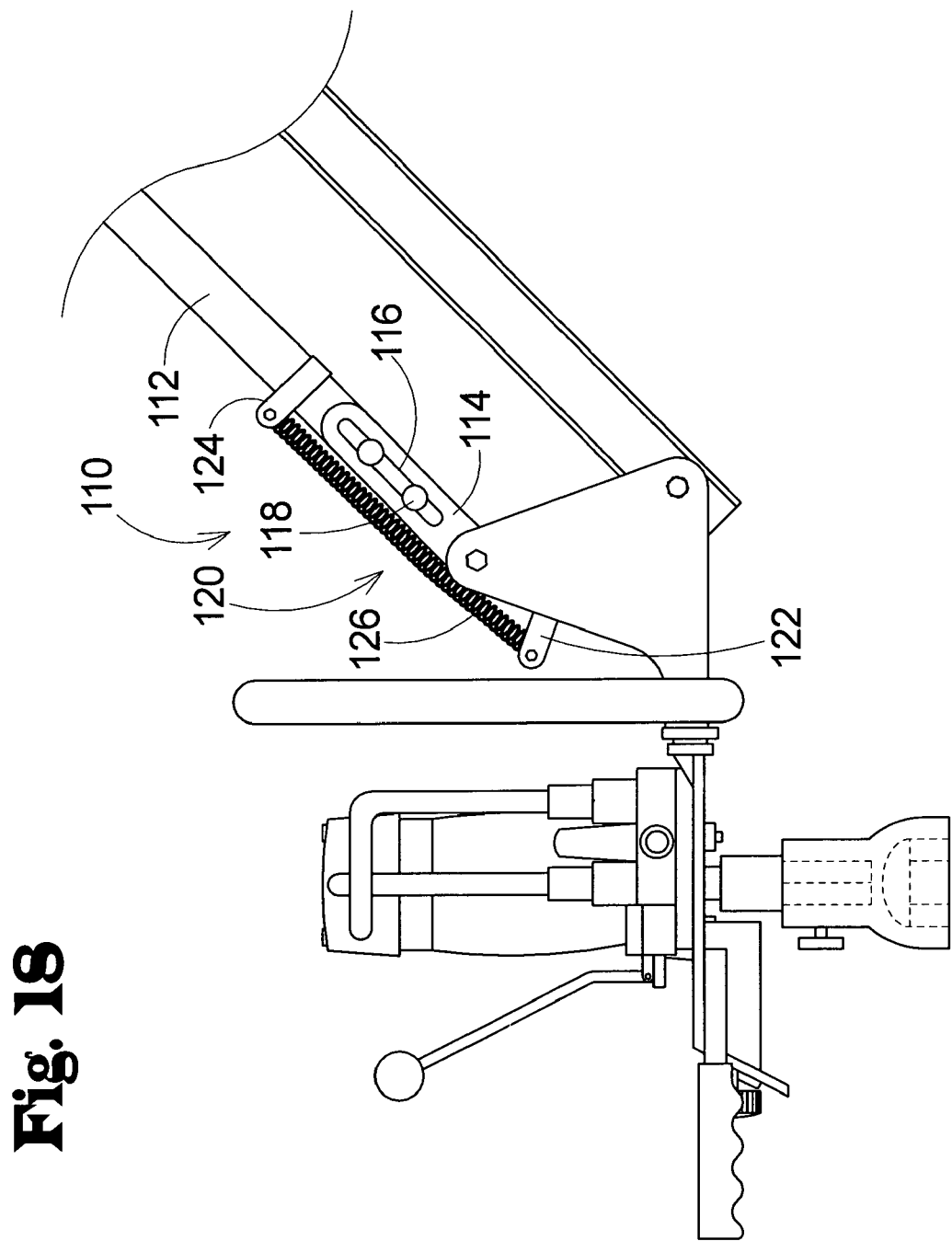
FIG. 18 is a schematic perspective view of the secondary assistance assembly in a position generally corresponding to the position of the suspension assembly shown in FIG. 14.
Figure 19:
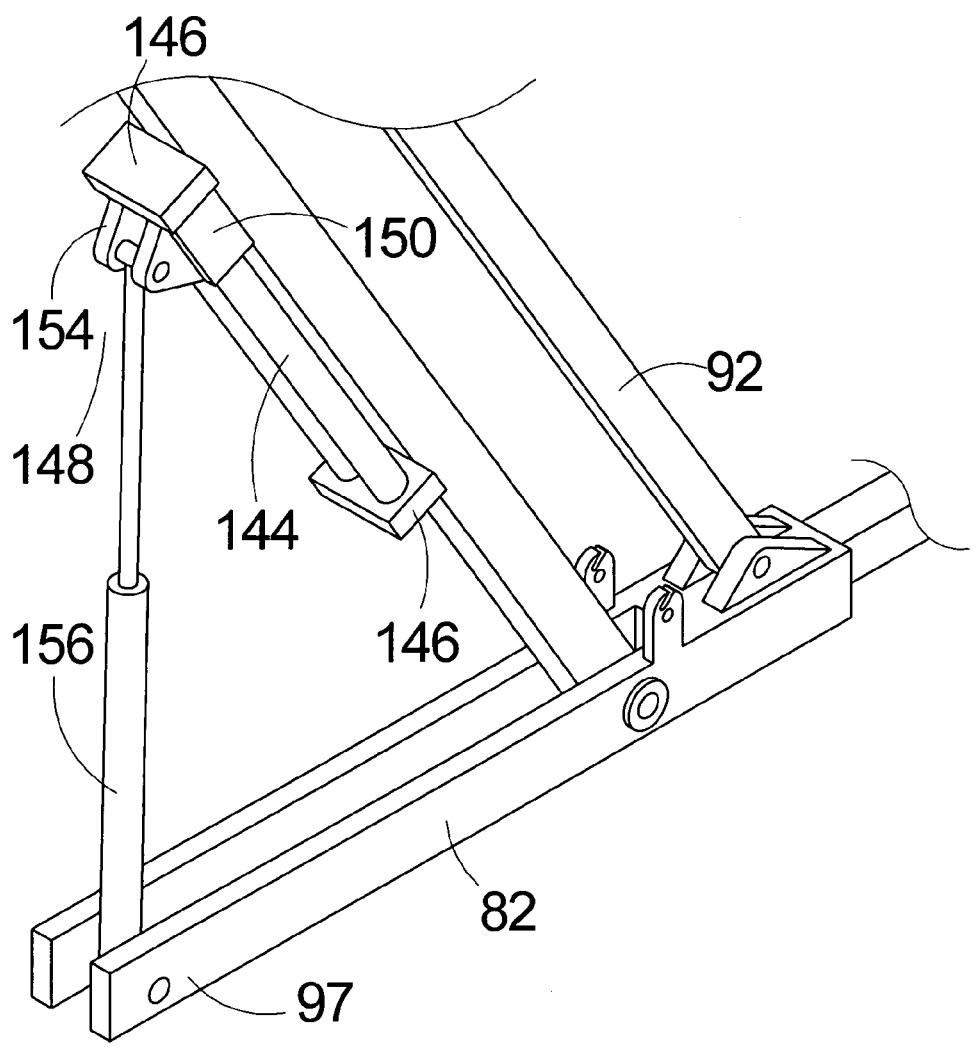
FIG. 19 is a schematic side view of an outboard end of the suspension assembly of the second embodiment particularly showing the orientation adjustment assembly.

The second locking means 76 includes a pair of aligned holed flanges 74 in the connection portion 16 of the first arm portion 22. The second arm portion 24 includes a locking aperture 17 alignable with holes 18 in the flanges 74. A locking pin 19 is insertable through the aligned holes 18 and aperture 17 whereby the second arm 24 is prevented from pivoting relative to the connection portion 16 of the first arm portion 22. Additionally, in an embodiment, the second locking means 76 may be a locking bar 27 extending from the second arm portion 24 for engaging a latch member 28 fixedly coupled to the first arm portion 22 as shown in FIG. 11. The locking bar and latch member may be used alone for securing the arm assembly during relatively short trips between valve sites or in combination with the locking pin 19 and aligned holes 18 for maximum stability as desired. The invention may include either one of the above described locking structures or both in combination as each provides unique advantages.

Optionally, an extension member 14 is couplable between the articulated arm assembly 20 and the vehicle 2 for spacing the second arm portion 24 from the vehicle 2 to permit free movement of the second arm portion 24 when a tailgate of the vehicle is in an open position.

A plurality of handles 58 are coupled to the rotating assembly 30 for facilitating grasping and movement of the rotating assembly 30. The handles 58 are being arranged to form two opposing handle pairs 59. The handle pairs 59 are substantially aligned with respect to each other.

In an embodiment, the rotating assembly 30 is coupled to the articulated arm assembly such that the rotating assembly is pivotable around a horizontal axis to permit positioning of the rotating assembly 30 in a desired position to engage valves that are not in perfect horizontal alignment such that the shaft is in a non-vertical position when engaged to the valve. The coupling of the rotating assembly 30 is achieved by having a post 35 extend from the rotating portion. A rotating assembly connection member 33 includes a bearing portion 36 secured to the post 35 and a pair of limiting bars 37 that extend out from the rotating assembly connection member 33 to contact the rotating assembly to limit the pivoting range of the rotating assembly around the horizontal axis.

In use, the articulated arm assembly is coupled to a vehicle using a conventional hitch mounted anywhere on the vehicle including the front or back. The vehicle can be driven to a position adjacent an access port in the road that gives access to an underground valve. The invention permits positioning of the vehicle anywhere within a range of the access port so that the vehicle does not have to be moved to precisely align the rotating device with the access port. Typically, the valve being tested is positioned a distance beneath the road, often 4 to six feet. A shaft, which may have an adjustable length either by being telescopic or having a one or more extension pieces, is engaged to the valve. The articulated arm is unlocked to permit free movement of the arm by a single person. The rotating device, typically a heavy hydraulically powered device, is then grasped and may be positioned by a single person.

When the biasing assemblies are used the weight of the rotating device is partially supported by the biasing in the articulated arm. Adjustments to the amount of support can be achieved through the use of multiple interchangeable springs or other known methods of varying the assistance of a biasing member.

The pivoting of the articulated arm permits movement of the rotating device within a three dimensional space while holding the rotating device in the necessary substantially horizontal orientation. Additional pivoting of the rotating device is provided to facilitate attachment of the rotating device to shafts when the shaft is slightly off vertical orientation as may happen when the valve is in a slightly tilted position. The rotating device can be positioned immediately over the shaft and then lowered to engage the shaft. The rotating device remains in engagement with the shaft by the residual weight of the rotating device not supported by the articulated arm or the user. The user may also push downwardly on the rotating device during use if desired or otherwise deemed necessary.

Typically, the testing is done by loosening and re-tightening a number of rotations. In an embodiment, a counter is used to count the number of rotations to facilitate the current testing methods. Alternately, torque measurement style testing is now facilitated by the present invention if the invention is equipped for measuring or responding to pre-determined torque conditions during rotation. Upon completion of the testing, the rotating device is disengaged from the shaft and the articulated arm returned to a retracted, storage position and then locked into place to permit safe movement of the vehicle to the next testing place. This new method provides a significant increase in efficiency allowing many more valves to be tested in a given amount of time.

Through use of the adapter described above or through integral shaping of the protrusion of the rotating device, the rotating device may also be engaged to fire hydrant valves as desired.

As shown in FIGS. 13 through 19, a second embodiment 80 of the suspension arm assembly is similar to the first embodiment 10 shown in FIGS. 1 through 12, particularly in terms of function, although the second embodiment is believed to provide additional benefits in terms of structural simplicity and ruggedness, as well as operational and functional benefits as compared to the first embodiment, by, for example, providing supplement support to the outboard end of the suspension arm assembly when the assembly is extended beyond a region situated relatively close to the support on which the suspension is mounted.

In greater detail, the suspension arm assembly 80 for supporting a valve rotation assembly 81 from a support may comprise a base element 82 for mounting on a support structure, a first support element 84 pivotally mounted on the base element, a second support element 86 pivotally mounted on the first support element, a mounting element 88 mounted on the second support element, a linking element 90 pivotally mounted on the first and second support elements, a first stabilizing element 92 pivotally mounted on the base element and on the linking element, and a second stabilizing element 94 mounted on the linking element and the mounting element. The suspension arm assembly 80 may be configured to permit rotation of the valve rotation assembly 81 about a first substantially horizontal axis and a second substantially horizontal axis, with the second substantially horizontal axis being oriented substantially perpendicular to the first substantially horizontally oriented axis. Thus, as the user addresses the valve rotation assembly 81, such as by grasping handles of the assembly 81 and/or by facing the controls of the assembly 81, the orientation of the assembly 81 is permitted to tilt laterally about a first substantially horizontal axis that extends along the path of extension of the suspension arm assembly, as well as permitting tilting about a second substantially horizontal axis that extends substantially perpendicular to the first substantially horizontal axis. The suspension arm assembly 80 may maintain the valve rotation assembly 81 in a substantially uniform orientation as the suspension arm assembly is flexed outwardly from the support and inward toward the support.

The support may comprise a vehicle, such as a receiver hitch element of the vehicle, or an intermediate structure such as the extended reach element described in my U.S. patent application Ser. No. 10/899,501, filed Jul. 26, 2004 and currently pending.

The base element 82 may be configured for mounting on a support, or an intermediate structure, and is preferably configured for being positioned in a substantially horizontal orientation, although variations from the horizontal may be accommodated. The base element 82 may be elongated and have a first end 96 for mounting on the support, and a second end 97 for orienting generally toward the valve to be exercised. The base element 82 may have a second portion 98 that is located toward the second end 97 of the element 82, and the second portion may be bifurcated into two arms.

The first support element 84 may be elongate with opposite ends 100 and 101. The first end 100 of the first support element is pivotally mounted on the base element 82, and may be mounted at a location that is between the second portion 98 and the first end 96. In some embodiments of the first support element 84, the first support element has a primary portion 102 and an offset portion 103 that extends along an axis that is oriented at an angle with respect to an axis of the primary portion 103.

The second support element 86 may be an elongate member with opposite first 104 and second 105 ends, and the first end 104 of the second support element may be pivotally mounted on the second end 97 of the first support element.

The linking element 90 may be pivotally mounted on the first support element 84, and may also be pivotally mounted on the second support element 86. The linking element 90 may be pivotable about a pivot point 106 about which the second support element 86 pivots about, or with respect to, the first support element 84. The linking element 90 may have a substantially triangular shape, with the pivot point 106 of the first and second support elements being located at one apex of the linking element, and additional mounting points are located at the other apexes of the triangle.

The first stabilizing element 92 links the base element 82 and the linking element 90, and may be pivotally mounted to the base element and the linking element, so that a parallel link arrangement is formed between the first support element 84 and the first stabilizing element. The first stabilizing element may be elongate, with opposite ends each mounted on the respective base 82 and linking 90 elements. In some embodiments of the invention, the first stabilizing element 92 has a primary portion 106 and an offset portion 107 that extends along an axis that is oriented at an angle with respect to an axis of the primary portion 106. The offset portion 103 of the first support element 84 may be oriented substantially parallel to the offset portion 107 of the first stabilizing element 92.

The suspension arm assembly 80 may comprise a mounting element 88 that is mounted on the second support element 86, preferably in a manner that permits the mounting element to pivot with respect to the second support element. The valve rotation assembly 81 may be mounted on the mounting element 88 to thereby support the valve rotation assembly on the arm assembly 80.

The second stabilizing element 94 may link the linking element 90 and the mounting element 88, and may be pivotally mounted to the linking element and pivotally mounted to the mounting element, so that a parallel link arrangement is formed between the second support element 86 and the second stabilizing element.

The suspension arm assembly 80 may comprise an orientation adjustment assembly 110 for adjusting an orientation of the mounting element 88, so that the orientation of the valve rotation assembly 81 mounted on the mounting element 88 may be adjusted, for example, into an orientation that is substantially horizontal, or into an orientation that is not horizontal. In the illustrative embodiment of the orientation adjustment assembly 110, the assembly may be configured to adjust a length of the second stabilizing element 94 to adjust a distance between the mounting element 88 and the linking element 90 to thereby change the orientation of the mounting element 88. Illustratively, the orientation adjustment assembly 110 may be implemented by the second stabilizing element 94 being formed of two portions 112, 114 that are extensible and retractable with respect to each other, to thereby extend and retract a length of the second stabilizing element. A first one 112 of the portions of the second stabilizing element may be mounted on the mounting element 88 and a second one 114 of the portions may be mounted on the linking element 90. In one embodiment, the first 112 and second 114 portions are slidably mounted together to permit extension and retraction of the portions with respect to each other. One of the portions 112, 114 may include a slot 116 that extends along a portion of the other one of the portions, and the other one of the portions may have a fastener 118 mounted thereon that extends through the slot 116 in the one portion. The fastener 118 may be tightenable on the other one of the portions to selectively lock the positions of the portions 112, 114 with respect to each other, to thereby assist extension and retraction of the portions with respect to each other. Conversely, the fastener 118 may also be loosened to selectively release the portions 112, 114 from a locked condition to permit extension and retraction of the portions with respect to each other. In this way, the orientation of the mounting element 88, and the valve rotation assembly 81 attached thereto, may be adjusted.

The orientation adjustment assembly 110 may further comprise a biasing assembly 120 for biasing the two portions 112, 114 of the second stabilizing element 94 toward a contracted condition. In one embodiment, the biasing assembly 120 comprises a first spring mount 122 mounted on the mounting element 88, a second spring mount 124 mounted on one of the portions 114 of the second stabilizing element 94, and a spring 126 that is mounted on the first 122 and second 124 spring mounts for biasing the mounts toward each other and thereby biasing the second portion 114 of the second stabilizing element 94 toward the mounting element 88. In some embodiments, the spring 126 comprises a tension spring.

A highly significant and advantageous aspect of the invention is a multiple stage assistance assembly 130 of the suspension arm assembly 80 that applies multiple degrees or magnitudes of assistance to movement of the first support element 84 with respect to the base element 82. More particularly, the multiple stage assistance assembly 130 may apply a first degree of assistance to pivot movement of the first support element 84 over a first arc ($\alpha$) of pivot movement of the first support element, and may apply a second degree of assistance to pivot movement of the first support element over a second arc ($\beta$) of pivot movement of the first support element. In one embodiment of the invention, the second degree of assistance is greater in magnitude than the first degree of assistance, which provides greater support to the valve rotation assembly 81 at relatively greater or longer extensions of the suspension arm assembly away from the support, while providing less assistance and a lesser degree of support at relatively lesser or shorter extensions of the arm assembly from the support.

In one embodiment of the invention, the multiple stage assistance assembly 130 includes a primary assistance assembly 132 for assisting movement of the first support element 84 with respect to the base element 82, and acts on the first support element during pivot movement of the first support element through the first arc and the second arc of movement. The primary assistance assembly 132 may be pivotally mounted on the base element 82 and on the first support element 84. In the illustrative embodiment, the primary assistance assembly 132 is mounted on the base element 82 toward the second end 97 thereof, and a mount 134 located on the first support element 84. The mount 134 may be positioned at a medial location on the first support element 84.

The primary assistance assembly 132 may further comprise at least one assistance element 136 that is pivotally mounted on the base element 82 and on the first support element 84, and in some embodiments includes a pair of assistance elements.

The multiple stage assistance assembly 130 may also include a secondary assistance assembly 140 for assisting movement of the first support element 84 with respect to the base element 82. The secondary assistance assembly 140 acts on the first support element 84 during pivot movement of the first support element through the second arc of movement, but preferably does not act on the first support element through the first arc of movement of the first support element. The secondary assistance assembly 140 may be pivotally mounted on the base element 82 and the first support element 84. The secondary assistance assembly 140 may be mounted at one end on the base element at the second end 101 thereof.

The secondary assistance assembly 140 may comprising a slide support assembly 142 mounted on the first support element 84, and may extend along a portion of a length of the first support element. The slide support assembly 142 may comprise at least one elongate guide 144, and may include a pair of elongate guides. The elongate guide or guides 144 may be oriented substantially parallel to the longitudinal axis of the first support element, and the pair of guides may be oriented substantially parallel to each other. The slide support assembly 142 may also comprise at least one guide support 146 that is mounted on the first support element 84, and preferably includes two guide supports mounted on and extending between the pair of elongate guides 144.

The secondary assistance assembly 140 may further include a slide assembly 148 that is slidably mounted on the slide support assembly 142. The slide assembly 148 may comprise a mounting block 150 that is mounted on the slide support assembly 142, and a passage 152 may extend through the mounting block that receives the elongate guide 144. As shown in the illustrative embodiment, the mounting block may include a pair of passages 152, and each of the passages may receive one of the elongate guides 144. The mounting block 150 may have a mount 154 located thereon. The secondary assistance assembly 140 may be mounted at one end on the mount 154, so the end of the secondary assistance assembly is movable with the mounting block 150 along the guides between the guide supports 146.

The secondary assistance assembly 140 may include at least one assistance element 156 that is pivotally mounted on the base element 82 and the mounting block slidably mounted on the first support element 84. Preferably, a pair of assistance elements 156 is utilized.

In use, as the first support element 84 moves through the first arc of movement, the slide assembly 148 slides substantially freely on the slide support assembly 142 and thus the secondary assistance assembly 140 does not apply any significant degree of assistance to the movement of the first support element 84 as the slide assembly is sliding (while the primary assistance assembly is acting on the first support element). As the first support element reaches the end of the first arc of movement, and approaches the second arc of movement, the slide assembly 148 abuts against one of the guide supports 146 so that the secondary assistance assembly 140 begins acting on the movement of the first support s element. The slide assembly 148 will continue to abut against the guide support 146 through the second arc of movement so that the secondary assistance assembly 140 continues to act on the first support element 84. Thus, through the second arc of movement, the assistance of the primary assistance assembly and the secondary assistance assembly is combined. As the first support element 84 is moved back toward the support (on which the base element 82 is mounted), the slide assembly 148 will move out of abutment with the guide support 146 as the first support element reaches the end of the second arc of movement and approaches the first arc of movement, so that the secondary assistance assembly 140 does not act on the first support element 84. Thus, when the suspension arm assembly 80 is extended beyond the first arc of movement, additional assistance or support is provided to the first and second support elements.

The suspension arm assembly 80 may also include a tertiary assistance assembly 158 that extends between the first support element 84 and the second support element 86 for assisting movement of the first and second support elements with respect to each other. In the illustrative embodiment, the tertiary assistance assembly 158 acts throughout the extension and retraction movement of the suspension arm assembly 80 without substantial interruption, although optionally the tertiary assistance assembly could operate in a manner similar to the secondary assistance assembly and act only during a portion of the movement of the second support element 86. The tertiary assistance assembly 158 may include at least one, and preferably two, assistance elements.

The assistance elements employed in the invention may comprise any suitable structure that provides a bias toward an extended condition, and in the illustrative embodiment, the assistance elements comprise piston and cylinder arrangements in which a gaseous fluid between the piston and cylinder provides a bias toward extending the piston and the connected rod toward an extended position of the rod. It will be evident to those skilled in the art that other elements may optionally be employed for the assistance elements, such as, for example, compression spring elements.

An optional embodiment 160 of the suspension arm assembly is shown in FIG. 20 of the drawings, and includes similar first and second support elements as well as similar first and second stabilizing elements and base and mounting elements. Rather than employing the assistance assemblies of the aforedescribed embodiment, the suspension arm assembly 160 employs a mast 162 mounted on the base element that is skewed or inclined away from the first support element and back toward the support on which the base element is mounted, and an outboard end of the mast may include a roller or other low friction element to permit relatively free movement about the outboard end. A tension element 164 may be linked between the base element and the first support element and extended about the mast 162 to thereby bias the first support element into an upright position and the suspension arm assembly toward a retracted condition. A line or cord may be connected to an end of the tension element to extend about the roller on the mast and extend between the mast and the tension element to transfer the pulling force to the first support element.

It should be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, unless particular features are mutually exclusive, all of the various combinations of the features are intended to be encompassed by the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A valve exercising system comprising:
   a valve exerciser assembly for releasably engaging a stem of a valve and rotating the stem of the valve between an open condition and a closed condition; and
   a valve exerciser suspension arm assembly for supporting the valve exerciser assembly from a support, the suspension arm assembly maintaining the valve exerciser assembly in a uniform orientation as the suspension arm assembly is flexed, the suspension arm assembly comprising:
   a base element for mounting on the support;
   a first support element pivotally mounted on the base element;
   a second support element pivotally mounted on the first support element;
   a linking element pivotally mounted on the first support element;
   a first stabilizing element linking the base element and the linking element, the first stabilizing element being pivotally mounted to the base element and pivotally mounted to the linking element;
   a mounting element pivotally mounted on the second support element, the valve exerciser assembly being mounted on the mounting element; and
   a second stabilizing element linking the linking element and the mounting element, the second stabilizing element being pivotally mounted to the linking element and being pivotally mounted to the mounting element;
   at least two movement assistance assemblies for assisting pivot movement of the first support element with respect to the base element through an arc of movement, one of said assistance assemblies assisting pivot movement for a first portion of the arc of movement and said one assistance assembly not assisting pivot movement for a second portion of the arc of pivot movement.

2. The system of claim 1 wherein the valve exerciser assembly comprises:
   a platform;
   a motor mounted on the platform for rotating the valve stem when an output shaft of the motor is linked to the valve stem;
   means for controlling the rotation of the output shaft of the motor.

3. The system of claim 1 wherein the at least two assistance assemblies apply a first degree of assistance to pivot movement of the first support element over a first arc of pivot movement of the first support element and a second degree of assistance to pivot movement of the first support element over a second arc of pivot movement of the first support element.

4. The system of claim 3 wherein the second degree of assistance is greater than the first degree of assistance.

5. The system of claim 3 wherein the at least two assistance assemblies comprise:
   a primary assistance assembly configured to assist movement of the first support element with respect to the base element during pivot movement of the first support element through a first arc of movement of the firsts support element and a second arc of movement of the first support element; and
   a secondary assistance assembly configured to assist movement of the first support element with respect to the base element during pivot movement of the first support element through the second arc of movement.

6. The system of claim 5 wherein the secondary assistance assembly is configured to not assist movement of the first support element through the first arc of movement of the first support element.

7. The system of claim 5 wherein the primary assistance assembly acts on the first support element during pivot movement of the first support element through the first arc and the second arc of movement, and the secondary assistance assembly acts on the first support element during pivot movement of the first support element through the second arc of movement.

8. The system of claim 7 wherein the primary assistance assembly is pivotally mounted on the base element and the first support element, and the secondary assistance assembly being pivotally mounted on the base element and the first support element.

9. The system of claim 5 wherein the secondary assistance assembly comprises:
   a slide support assembly mounted on the first support element, the slide support assembly extending along a portion of a length of the first support element; and
   a slide assembly slidably mounted on the slide support assembly and configured to slide on the slide support assembly along the portion of the length of the first support element.

10. The system of claim 9 wherein the secondary assistance assembly comprises at least one assistance element mounted on the base element and on the slide assembly.

11. The system of claim 9 wherein the slide assembly substantially freely slides on the slide support assembly as the first support element moves through the first arc of movement and is prevented from freely sliding on the slide support assembly through the second arc of movement.

12. The system of claim 9 wherein the slide support assembly comprises:
    at least one elongate guide; and
    at least one guide support mounted on the first support element and the at least one guide for supporting the at least one guide on the first support element;
    wherein the slide assembly abuts against the at least one guide support when the first support element moves in the second arc of movement.

13. The system of claim 12 wherein the slide assembly comprises a mounting block mounted on the at least one guide, a passage extending through the mounting block and receiving the at least one guide.

14. The system of claim 1 wherein the at least two assistance assemblies apply a first degree of assistance to pivot movement of the first support element over a first arc of pivot movement of the first support element and a second degree of assistance to pivot movement of the first support element over a second arc of pivot movement of the first support element;
  wherein the second degree of assistance is greater than the first degree of assistance;
  wherein the at least two assistance assemblies comprise:
    a primary assistance assembly configured to assist movement of the first support element with respect to the base element during pivot movement of the first support element through a first arc of movement of the first support element and a second arc of movement of the first support element; and
    a secondary assistance assembly configured to assist movement of the first support element with respect to the base element during pivot movement of the first support element through the second arc of movement;
  wherein the secondary assistance assembly is configured to not assist movement of the first support element through the first arc of movement of the first support element;
  wherein the primary assistance assembly acts on the first support element during pivot movement of the first support element through the first arc and the second arc of movement, and the secondary assistance assembly acts on the first support element during pivot movement of the first support element through the second arc of movement;
  wherein the primary assistance assembly is pivotally mounted on the base element and the first support element, and the secondary assistance assembly being pivotally mounted on the base element and the first support element;
  wherein the secondary assistance assembly comprises:
    a slide support assembly mounted on the first support element, the slide support assembly extending along a portion of a length of the first support element; and
    a slide assembly slidably mounted on the slide support assembly and configured to slide on the slide support assembly along the portion of the length of the first support element;
    at least one assistance element mounted on the base element and on the slide assembly;
    wherein the slide assembly substantially freely slides on the slide support assembly as the first support element moves through the first arc of movement and is prevented from freely sliding on the slide support assembly through the second arc of movement;
    wherein the slide support assembly comprises:
      at least one elongate guide; and
      at least one guide support mounted on the first support element and the at least one guide for supporting the at least one guide on the first support element;
      wherein the slide assembly abuts against the at least one guide support when the first support element moves in the second arc of movement;
    wherein the slide assembly comprises a mounting block mounted on the at least one guide, a passage extending through the mounting block and receiving the at least one guide.

15. A valve exercising system comprising:
  a valve exerciser assembly for releasably engaging a stem of a valve and rotating the stem of the valve between an open condition and a closed condition; and
  a valve exerciser suspension arm assembly for supporting the valve exerciser assembly from a support, the suspension arm assembly maintaining the valve exerciser assembly in a uniform orientation as the suspension arm assembly is flexed, the suspension arm assembly comprising:
    a base element for mounting on the support;
    a first support element pivotally mounted on the base element;
    a second support element pivotally mounted on the first support element; and
    a movement assistance assembly applying at least two degrees of assistance to pivot movement over an arc of movement of the first support element with respect to the base element, the arc of movement including a first arc of movement and a second arc of movement, the assistance assembly comprising:
      a primary assistance assembly assisting pivot movement of the first support element with respect to the base element through the first arc of movement and the second arc of movement; and
      a secondary assistance assembly assisting pivot movement of the first support element with respect to the base element through the second arc of movement, the secondary assistance assembly being configured to not assist pivot movement of the first support element with respect to the base element through the first arc of movement.

16. The system of claim 15 wherein a degree of pivot movement assistance applied by the movement assistance assembly through the first arc of movement is greater than a degree of assistance provided by the movement assistance assembly through the second arc of movement.

17. The system of claim 15 wherein each of the primary and secondary assistance assemblies include a telescopic element having a retracted condition and an extended condition, the telescopic element being biased toward the extended condition.

18. The system of claim 15 wherein the secondary assistance assembly comprises:
  a slide support assembly mounted on the first support element, the slide support assembly extending along a portion of a length of the first support element; and
  a slide assembly slidably mounted on the slide support assembly and configured to substantially freely slide on the slide support assembly along the portion of the length of the first support element through the second arc of movement, the slide support assembly blocking sliding movement of the slide assembly on the slide support assembly through the first arc of movement of the first support element.

19. The system of claim 15 wherein the suspension arm assembly further comprises:
  a linking element pivotally mounted on the first support element;
  a first stabilizing element linking the base element and the linking element, the first stabilizing element being pivotally mounted to the base element and pivotally mounted to the linking element;
  a mounting element pivotally mounted on the second support element, the valve exerciser assembly being mounted on the mounting element; and
  a second stabilizing element linking the linking element and the mounting element, the second stabilizing element being pivotally mounted to the linking element and being pivotally mounted to the mounting element.

20. The system of claim 15 wherein the first arc of movement and the second arc of movement do not overlap.

* * * * *